(12) United States Patent
Santoro et al.

(10) Patent No.: US 9,654,843 B2
(45) Date of Patent: May 16, 2017

(54) VIDEO MANAGEMENT AND MARKETING

(71) Applicant: InVidz, LLC, Clearwater, FL (US)

(72) Inventors: Vito Michael Santoro, Clearwater, FL (US); John S. Rizzo, Charleston, SC (US)

(73) Assignee: Vaetas, LLC, Charleston, SC (US)

( * ) Notice: Subject to any disclaimer, the term of this patent is extended or adjusted under 35 U.S.C. 154(b) by 0 days.

(21) Appl. No.: 15/171,773

(22) Filed: Jun. 2, 2016

(65) Prior Publication Data
US 2016/0360289 A1    Dec. 8, 2016

Related U.S. Application Data

(60) Provisional application No. 62/170,228, filed on Jun. 3, 2015.

(51) Int. Cl.
| | |
|---|---|
| *H04H 60/32* | (2008.01) |
| *H04N 21/81* | (2011.01) |
| *H04N 21/61* | (2011.01) |
| *H04N 21/2389* | (2011.01) |
| *H04N 21/488* | (2011.01) |
| *H04N 21/442* | (2011.01) |
| *H04N 21/254* | (2011.01) |
| *H04N 21/475* | (2011.01) |
| *H04N 21/2187* | (2011.01) |
| *G11B 27/031* | (2006.01) |

(Continued)

(52) U.S. Cl.
CPC ......... *H04N 21/812* (2013.01); *G11B 27/031* (2013.01); *H04N 21/2187* (2013.01); *H04N 21/23892* (2013.01); *H04N 21/2541* (2013.01); *H04N 21/25883* (2013.01); *H04N 21/2743* (2013.01); *H04N 21/44204* (2013.01); *H04N 21/4508* (2013.01); *H04N 21/475* (2013.01); *H04N 21/4753* (2013.01); *H04N 21/47202* (2013.01); *H04N 21/4882* (2013.01); *H04N 21/6125* (2013.01); *H04N 21/84* (2013.01); *H04N 21/8586* (2013.01)

(58) Field of Classification Search
CPC ............ H04N 21/812; H04N 21/6125; H04N 21/23892; H04N 21/4882; H04N 21/44204; H04N 21/2541; H04N 21/4753; H04N 21/2187; H04N 21/25883; H04N 21/4508; H04N 21/84; H04N 21/8586; G11B 27/031
See application file for complete search history.

(56) References Cited

U.S. PATENT DOCUMENTS

| | | |
|---|---|---|
| 5,987,509 A | 11/1999 | Portuesi |
| 6,006,265 A | 12/1999 | Rangan et al. |

(Continued)

*Primary Examiner* — Oschta Montoya

(57) ABSTRACT

A computer-implemented method for operating a video management and marketing system that enables managing and marketing videos produced or provided by a user includes a processor configures an embed code that is unique to the user to show a real-time call to action that streams real-time data in one or more videos displayed to a viewer at a viewer device; the processor displays the real-time call to action during playback of the video at a first site and uses the real-time call to action to fetch call to action information on the fly; and the processor automatically forwards the viewer device to a second site, where the call to action information is displayed, upon completion of playback of the video at the first site.

12 Claims, 22 Drawing Sheets

(51) Int. Cl.
  *H04N 21/258* (2011.01)
  *H04N 21/45* (2011.01)
  *H04N 21/84* (2011.01)
  *H04N 21/858* (2011.01)
  *H04N 21/2743* (2011.01)
  *H04N 21/472* (2011.01)

(56) References Cited

U.S. PATENT DOCUMENTS

| | | |
|---|---|---|
| 6,175,840 B1 | 1/2001 | Chen et al. |
| 6,188,398 B1 | 2/2001 | Collins-Rector et al. |
| 6,240,555 B1 | 5/2001 | Shoff et al. |
| 6,570,586 B1 | 5/2003 | Kamen et al. |
| 6,570,587 B1 | 5/2003 | Efrat et al. |
| 6,636,237 B1 | 10/2003 | Murray et al. |
| 7,017,173 B1 | 3/2006 | Armstrong et al. |
| 8,150,386 B2 | 4/2012 | Forrester et al. |
| 8,175,921 B1 | 5/2012 | Kopra |
| 8,479,246 B2 | 7/2013 | Hudson et al. |
| 8,893,180 B2 | 11/2014 | Barton et al. |
| 2001/0033296 A1 | 10/2001 | Fullerton et al. |
| 2002/0078456 A1 | 6/2002 | Hudson et al. |
| 2004/0122746 A1 | 6/2004 | Charlier et al. |
| 2006/0089843 A1 | 4/2006 | Flather |
| 2008/0163379 A1 | 7/2008 | Robinson et al. |
| 2009/0210790 A1 | 8/2009 | Thomas |
| 2011/0052144 A1* | 3/2011 | Abbas .................. G11B 27/034 386/240 |
| 2011/0060993 A1 | 3/2011 | Cotter et al. |
| 2012/0004982 A1 | 1/2012 | Cohee et al. |
| 2012/0084811 A1 | 4/2012 | Thompson et al. |
| 2012/0179536 A1* | 7/2012 | Kalb .................. G06Q 30/0244 705/14.43 |
| 2012/0296739 A1 | 11/2012 | Cassidy et al. |
| 2014/0013230 A1* | 1/2014 | Malone .................. H04N 5/93 715/723 |
| 2014/0026048 A1 | 1/2014 | Spirer |
| 2014/0373173 A1* | 12/2014 | Baker, II ................ G06Q 30/00 726/27 |

* cited by examiner

| Dashboard | Campaigns | Media Library | Scheduling | | John Smith ∨ |

Campaigns

420

AppVideos New Features
- Manage Videos  Automation  Duplicate    [Manage Campaign] [Add Video]

Listenin' Booth Dinnerware
- Manage Videos  Automation  Duplicate    [Manage Campaign] [Add Video]

AppVideos New Features
- Manage Videos  Automation  Duplicate    [Manage Campaign] [Add Video]

Listenin' Booth Dinnerware
- Manage Videos  Automation  Duplicate    [Manage Campaign] [Add Video]

AppVideos New Features
- Manage Videos  Automation  Duplicate    [Manage Campaign] [Add Video]

Listenin' Booth Dinnerware
- Manage Videos  Automation  Duplicate    [Manage Campaign] [Add Video]

Edit Video

480

Title: Listenin' Booth Dinnerware New Collection Campaign

| Duration | Width | Height | Provider |
|---|---|---|---|
| 00:03:11 | 577 | 357 | youtube |

Description

Keywords: promo x | booth x | Add Keywords

Tags: promo x | booth x | Add Keywords

Save  Cancel  X

Save  Cancel

| Step | |
|---|---|
| User imports one or more updated videos from, for example, a video hosting site and the system automatically adds the updated video(s) to the user's account, with the updated videos configured with the embed code of the prior video(s) so as to play the updated video(s) with the set of interactive calls to action | ~805 |
| ↓ | |
| User adds the updated video to the desired campaign(s) and checks the call to action placement on the updated video | ~810 |
| ↓ | |
| User, optionally, changes embed code configuration to use the updated video | ~820 |
| ↓ | |
| User clicks a Replace Video Button in the dashboard and all currently distributed videos are replaced in real-time preserving interactivity using same deployed video embed code | ~830 |

FIG. 8

VIDEO MANAGEMENT AND MARKETING

RELATED APPLICATIONS

This application claims the benefit of provisional patent application Ser. No. 62/170,228 filed Jun. 3, 2015, entitled "Video Management and Marketing," the disclosure of which is incorporated by reference.

BACKGROUND

Video content such as available, for example, on video hosting Web sites or on video sharing Web sites provides a potentially rich environment of marketing products and services and publicizing ideas. One mechanism for using this potentially rich environment involves "calls to action" that may be displayed in conjunction with display of the video content. However, video content with currently-available calls to action do not take full advantage of video as a marketing tool.

SUMMARY

A computer-implemented method for operating a video management and marketing system that enables managing and marketing videos produced or provided by a user includes a processor configures an embed code that is unique to the user to show a real-time call to action that streams real-time data in one or more videos displayed to a viewer at a viewer device; the processor displays the real-time call to action during playback of the video at a first site and uses the real-time call to action to fetch call to action information on the fly; and the processor automatically forwards the viewer device to a second site, where the call to action information is displayed, upon completion of playback of the video at the first site.

A computer-implemented method for operating a video management and marketing system that enables managing and marketing videos produced or provided by a user includes a processor configures a user-unique embed code that links a real time call to action to a video; during playback of the video to a viewer at a first site, the processor uses the link to display the real-time call to action and fetch call to action information on the fly; and the processor automatically forwards the viewer device to a second site upon completion of playback of the video at the first site.

A non-transitory computer readable storage medium has encoded thereon instructions for operating a video management and marketing system that enables managing and marketing videos produced or provided by a user. A processor executes the instructions to register the user and create a user account; configure an embed code that is unique to the user to show a real-time call to action that streams real-time data in one or more videos displayed to a viewer at a viewer device; display the real-time call to action during playback of the video at a first site and uses the real-time call to action to fetch call to action information on the fly; and automatically forward the viewer device to a second site upon completion of playback of the video at the first site.

DESCRIPTION OF THE DRAWINGS

The detailed description refers to the following figures in which like numbers refer to like items, and in which:

FIGS. 4A-4J illustrate examples of a user interface associated with the system of FIG. 3; and FIGS. 5-8 are flowcharts illustrating example video management and marketing methods using the system of FIG. 3.

DETAILED DESCRIPTION

Figure 1:
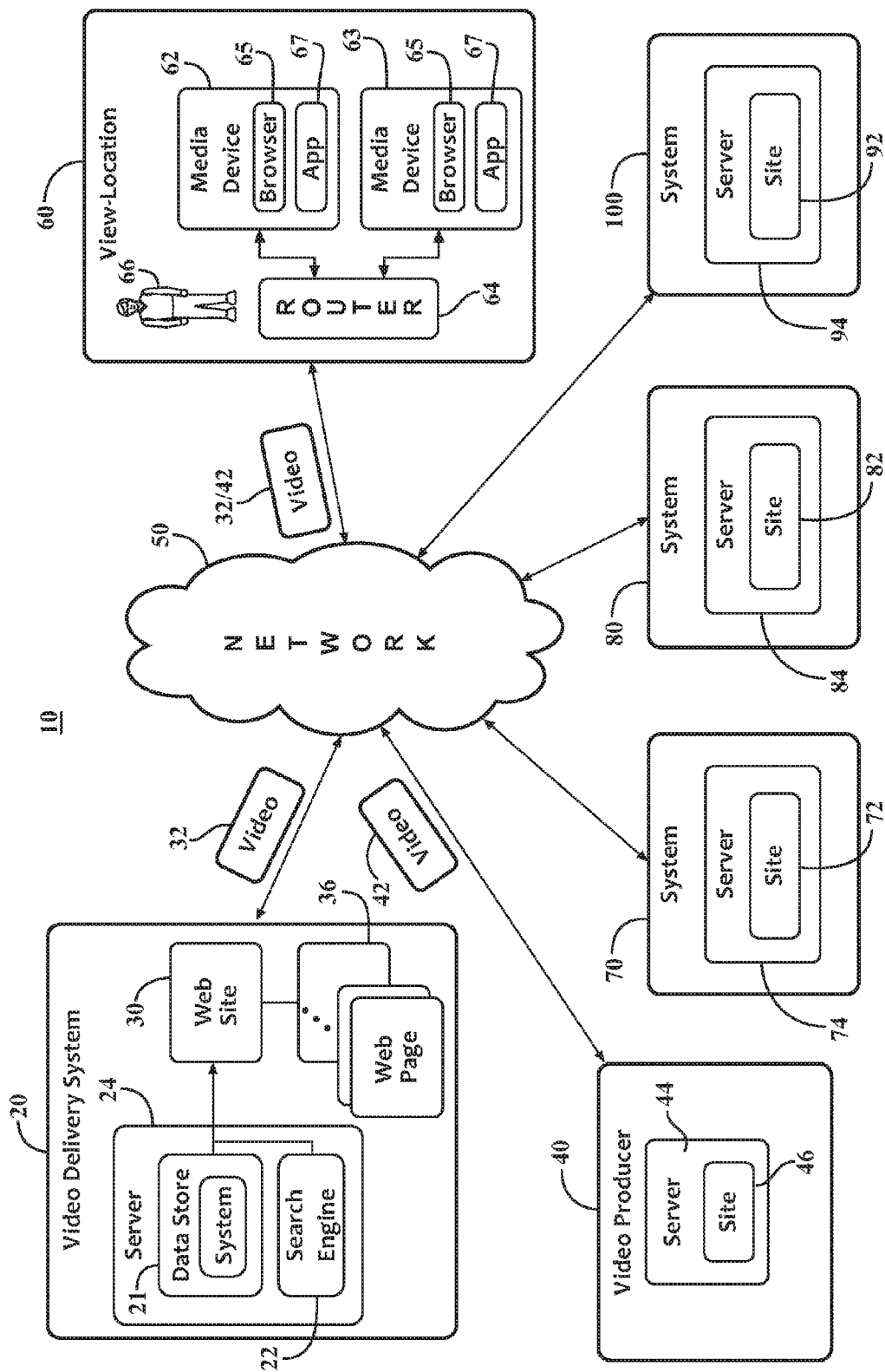
FIG. 1 illustrates an example of a video distribution environment.

Video delivery systems have become a significant avenue for marketing goods and services. Video delivery systems include dedicated, network-based (e.g., Internet-based) video hosting and delivery systems and social networking systems, for example. Such systems provide users and viewers with mechanisms for spreading information, promoting ideas, products, and services, connecting individual viewers, connecting users and viewers, and allowing individual viewers to respond to various promotions. Video delivery systems also allow any individual user or viewer to create, upload, display and view video content, and to interact with videos provided by other individuals, users, or viewers through the video delivery system.

For clarity and ease of discussion, but without way of limitation, the description that follows refers to video content, or simply videos, delivered over a network such as the Internet, or any other suitable video delivery mechanism. Videos refer to content that follows any one of hundreds of video file formats, including, without limitation, .mpg, .mov, .avi, and .wmv file formats, for example. Videos may include movie clips, advertisements, homemade videos, and other videos. Videos may render actual events, people, or places. Videos also may be animated. Videos may incorporate real-life and animated features.

Also for clarity and ease of discussion, and also without imposing any limitations, the description that follows refers to the following terms and definitions:

- Channel refers to a compilation of videos. Such videos may be organized by theme or may be related to each other in some fashion.
- User refers to an advertiser, marketer, sales professional, and/or producer of ideas, goods or services that employs the herein disclosed video marketing and management system to more effectively use existing video delivery mechanisms in the marketing of those ideas, goods, and services.
- Viewer refers to an individual who views or listens to a video provided by a user as defined above. In a specific example, a viewer is a Web site visitor.
- Channel Subscriber refers to a viewer who signs on to a specific video channel. Such subscribers may be provided with notifications when the lineup of videos in a subscribed-to channel changes.
- Subscriber refers to a viewer, user, or other individual who subscribes to a specific service, including a network-based video hosting or delivery system, a telephone system (wired or wireless), a social network, an email system, a text system, or any similar system now existing or later developed.

Videos may be provided by a video producer and made available to viewers through the video provider's own Web site, a Web 2.0 account, an email or messaging system, and other distribution means. The actual videos displayed in this manner may originate with the video producer, or may be acquired from other sources. In addition, videos may be available through video hosting and delivery systems or on video sharing Web sites.

Mechanisms for maximizing the effectiveness of these video environments include "calls to action" that are incorporated into the video during the video delivery and display processes. However, simple calls to action may not take full advantage of video as a marketing tool.

Disclosed herein are mechanisms and methods to maximize use of video environments by providing marketers and other users with an intuitive, intelligent video marketing and management system that can be integrated into existing video hosting and delivery systems to ensure easy access to a wide variety and a great number of videos. In an embodiment, the disclosed systems allow users to add interactive calls to action to videos, thereby creating augmented videos. In an aspect, a user may add such calls to action to all videos that are part of a specific marketing campaign or to all videos in a specific video channel, for example. Furthermore, when additional videos are added to the campaign or channel, or original videos are updated, the originally-designated calls to action may be added, automatically, to the new videos. Still further, when a video is modified, changed, or revised, the originally-designated calls to action may be applied automatically to the modified, changed, or revised videos. Yet further, new calls to action may be added automatically to existing videos in a campaign or channel. Thus, the herein disclosed interactive call to action functionality, which a user may desire for a specific marketing campaign or video channel, may be added simultaneously to all the campaign videos or all channel videos, and users then may modify the calls to action on a per video basis if desired.

In addition, the calls to action allow viewers to interact without adversely affecting the viewer's viewing experience. For example, and as is described below, a viewer may respond to a call to action while the viewer is engaged in watching or otherwise interacting with a video. Thus, the viewer need not (but may) leave the video in order to take action. Alternately, the viewer may delay display of the call to action until immediately after completion of the video or at some later time subsequent to completion of the video. In another alternative, the viewer may receive the call to action on another device, such as a smartphone, while viewing the video on a computer, for example.

FIG. 1 illustrates an example of a video distribution environment. In FIG. 1, environment 10 includes video hosting and delivery system 20, video producer 40, communications network 50, video viewing location 60, social network systems 70 and 80, and video management and marketing system 100. In the discussion that follows, the video producer 40, or other entities shown in FIG. 1, may provide videos with interactive calls to action (an "augmented video") to viewers 66 directly though server 44 and Web site 46, through a Web 2.0 account, through video delivery system 20, or through social network systems 70 and 80, for example.

The video hosting and delivery system 20 may operate Web site 30. The Web site 30 is hosted on Web server 24. The Web site 30 includes Web pages 36. The Web site 30 may include Internet search features, such as search engine 22, that allow viewers 66 to search for videos, such as videos 32/42 and other content displayed by the Web server 24 on the Web pages 36. The Web pages 36 may display the videos 32/42, as well as video advertisements, static advertisements, and other information. The video advertisements, static advertisements, and other information may be standalone content, or may be incorporated into, referenced by, or linked to the videos 32/42. The Web server 24 may provide links to enable navigation among the Web pages 36.

The Web pages 36 may display search results in response to a search query submitted by viewer 66 using the search engine 22. For example, a Web page 36 may display several videos that satisfy a search query. Each such video may be assigned a unique identification (ID).

The Web site 30 may display videos created and uploaded by a user, a viewer 66, the video producer 40, and other entities.

The Web server 24 may incorporate components of a video advertisement system (not shown) that serves, or facilitates service of, advertisements on the Web pages 36.

The video hosting and delivery system 20 may provide videos through distribution means other than the Internet, including broadcast television.

The video hosting and delivery system 20 may allow viewers 66 and other individuals and users to subscribe to a video service of the video delivery system 20. In an aspect, the subscription may provide subscribers with greater access to features of the video delivery system 20. When subscribing, a viewer 66, individual, or user (subscriber) may be asked to provide certain personal information, such as age and gender, for example. The subscriber also may be able to link social networks, such as the social networks 72 and 82 to which the individual also is subscribed, to the video delivery system 20. In an aspect, a subscriber to the video delivery system 20 may be able to provide video comments for existing videos (including other video comments), which then may be viewed by other subscribers to the video delivery system 20 and to subscribers to the social networks 72 and 82.

Note that a viewer 66 also may subscribe to specific video channels.

The video producer 40 (i.e., a user, as defined herein) provides content, in the form of videos 42 that may, as discussed herein, be displayed and viewed and/or heard by the viewer 66 using the media devices 62 and 63. For example, the video producer 40 may create and provide videos, such as videos intended to market or publicize an idea, product, or service. As specific examples, the video producer may produce a series of videos for a political candidate, for an automobile, or for a travel service. The video producer 40 may intend the videos to be displayed by or through the server 44 and Web site 46, a Web 2.0 account, or an email service, or by or through other entities such as the video hosting and delivery system 20. For example, the video producer 40 may embed an image or thumbnail corresponding to a video in an email, and then may send the email to a list of email recipients. The thumbnail may include a link to the video that when activated, causes the video to be displayed in a full-screen mode without the need for a Web page. Alternately, the video producer 40 may periodically post videos on the Web site 46 or to the video producer's Web 2.0 account. The video producer 40 may be a company, a movie or television studio, or an individual. As is described herein, the video producer 40 may be a user of the system 100.

The communications network 50 may be any network that allows the transmission of signals, media, messages, voice, and data among the entities shown in FIG. 1, including radio, linear broadcast (over-the-air, cable, and satellite) television, on-demand channels, over-the-top media, including streaming video, movies, video clips, and games, and text, email, and still images, and transmission of signals, media, messages, voice, and data from a media device to another media device, computer, or server. The network 50 includes the Internet, cellular systems, and other current and future mechanisms for transmission of these and other media. The network 50 may be both wired and wireless. The network 50 may be all or a portion of an enterprise or secured network. In an example, the network 50 may be a virtual private network (VPN) between the video hosting and delivery system 20 and a media device at the viewing location 60 across a wire line or a wireless link. While illustrated as a single or continuous network, the network 50 may be divided logically into various sub-nets or virtual networks, so long as at least a portion of the network 50 may facilitate communications among the entities of FIG. 1.

The viewing location 60 may be the residence of an individual, such as viewer 66, who operates media devices 62 and 63 to access, through gateway (e.g., a router) 64, resources such as the Web site 30. The viewing location 60 may be a mobile location that changes with time as, for example, when the viewer 66 changes location. The media devices 62 and 63 may be fixed or mobile. For example, media device 62 may be an Internet connected smart television (iTV)(e.g., a television incorporating a processor and a browser); a basic or smart television connected to a set top box (STB) or other Internet-enabled device; a Blu-ray™ player; a game box; and a radio, for example. Media device 63 may be a tablet, a smartphone, a lap top computer, or a desk top computer, for example. The media devices 62 and 63 may include browsers, such as browser 65. The browser 65 may be a software application for retrieving, presenting, and traversing resources such as at the Web sites 30 and 46. A resource may be identified by a Uniform Resource Locator (URL) and may be a Web page, image, video, or other content. The URL may allow the browser 65 to connect to the Web sites 30 and 46. Hyperlinks present in resources enable the viewer 66 to navigate the browser 65 to related resources. The viewer 66 may operate the browser 65 to search for Web sites related to specific topics or to search for a specific Web site by URL. The media devices 62 and 63 also may include applications 67. The viewer 66 may cause the media devices 62 or 63 to execute an application 67, such as a mobile banking application, to access online banking services. The application 67 may involve use of a browser or other means, including cellular means, to connect to the online banking services. Other applications may include game applications. The game applications may include provisions for serving advertisements during the play of the game. Once connected to the Web site 30 or the Web site 46, the media devices 62 and 63 may allow viewing of content such as videos and static images generated by entities such as the video producer 40 and displayed on the Web pages 36 at the Web site 30 or Web pages (not shown) at the Web site 46. The videos and static images may include slots or spaces into which programs such as advertisements may be placed. When such a video or static image is to be viewed on the media devices 62 or 63, the browser 65 may send an advertisement (ad) request to an ad server (not shown) which may be answered with a video advertisement and/or a static advertisement.

The viewer 66 may access the social network systems 70 and 80 to use a social networking Web site.

The viewer 66 may use voice, email, text, and other systems to communicate with other viewers and with other entities shown in FIG. 1.

In some situations, information related to the viewer 66, including identities, makes and models of the media devices 62 and 63, browser language, geographical locations of the media devices 62 and 63, and other data, may be collected by the video hosting and delivery system 20 and other entities shown in FIG. 1.

Other entities shown in FIG. 1 also may collect publicly available information related to the viewer 66 and the viewer's media devices 62 and 63.

In situations in which the systems disclosed herein collect personal information about a viewer 66, or may make use of personal information, the viewer 66 may be provided with an opportunity to control whether programs or features collect viewer traffic (e.g., information about the viewer's social network, social actions or activities, profession, and viewing preferences, or current location), or to control whether and/or how to receive content that may be more relevant to or of more interest to the viewer 66. In addition, certain data may be treated in one or more ways before it is stored or used, so that personally identifiable information is removed. For example, a viewer's identity may be treated so that no personally identifiable information can be determined for the viewer 66, or a viewer's geographic location may be generalized where location information is obtained (such as to a city, ZIP code, or state level), so that a particular location of the viewer 66 cannot be determined. Thus, the viewer 66 may have control over what information is collected about the viewer 66, how that information is collected, and how the collected information is used.

Social network system 70 operates server 74 to provide social network site 72. The social network site 72 may allow subscribers, such as viewer 66, to interact with other subscribers, provide comments, upload videos, and upload images. Social network system 80 may operate in a fashion similar to that of system 70 using server 84 at social network site 82.

The viewer 66 may be a subscriber to one or both of the social network sites 72 and 82. To be a subscriber, the viewer 66 may register with the social network sites, and provide certain specific information, such as age and gender.

The viewer 66 may use the social network sites 72 and 82 to communicate with designated friends or contacts. The viewer 66 may use the social network sites 72 and 82 to make video comments that may be viewed by other subscribers. In an aspect, the viewer 66 may make video comments about existing content.

Video management and marketing system 100 allows a user, such as the video producer 40, to add interactive call to action functionality to one or more videos. The system 100 may be a standalone system or may be incorporated into the video delivery system 20. The system 100 allows addition of such call to action functionality to all or to a subset of videos. For example, using the system 100, the video producer 40 simultaneously may add calls to action to all videos in a campaign or a video channel. Once added, the calls to action may be modified on an individual video basis, or for all videos in a campaign or channel. The calls to action provided through the system 100 allow viewers 66 to interact with the videos by:

Sending direct email

Sending direct text messages or other forms of short messaging

Clicking to make a direct voice call

Downloading coupons and offers

Obtaining brochures, literature, and information related to users and the user's products and services, including updates regarding provision of those products and services Sending a link to a friend or other viewer Signing up for an email list Signing up for a consultation or appointment Signing up for Webinars Subscribing to a video channel Filling out surveys Posing a comment Purchasing products and/or services Donating to an organization or cause Moreover, the viewer 66 may, through the calls to action, interact with a video while still engaged watching the video. That is, the viewer 66 need not, but may leave the video in order to take action appropriate for a call to action. Implementation of these calls to action is described in more detail below. However, in an embodiment, the call to action process does not begin until video playback ends, at which time the viewer is presented with the call to action. Further, in this embodiment, the call to action process initiates automatically upon video playback termination. As noted above, such video playback termination may occur when the video ends, or, in an alternative, if and when a viewer 66 stops video playback.

Figure 3:
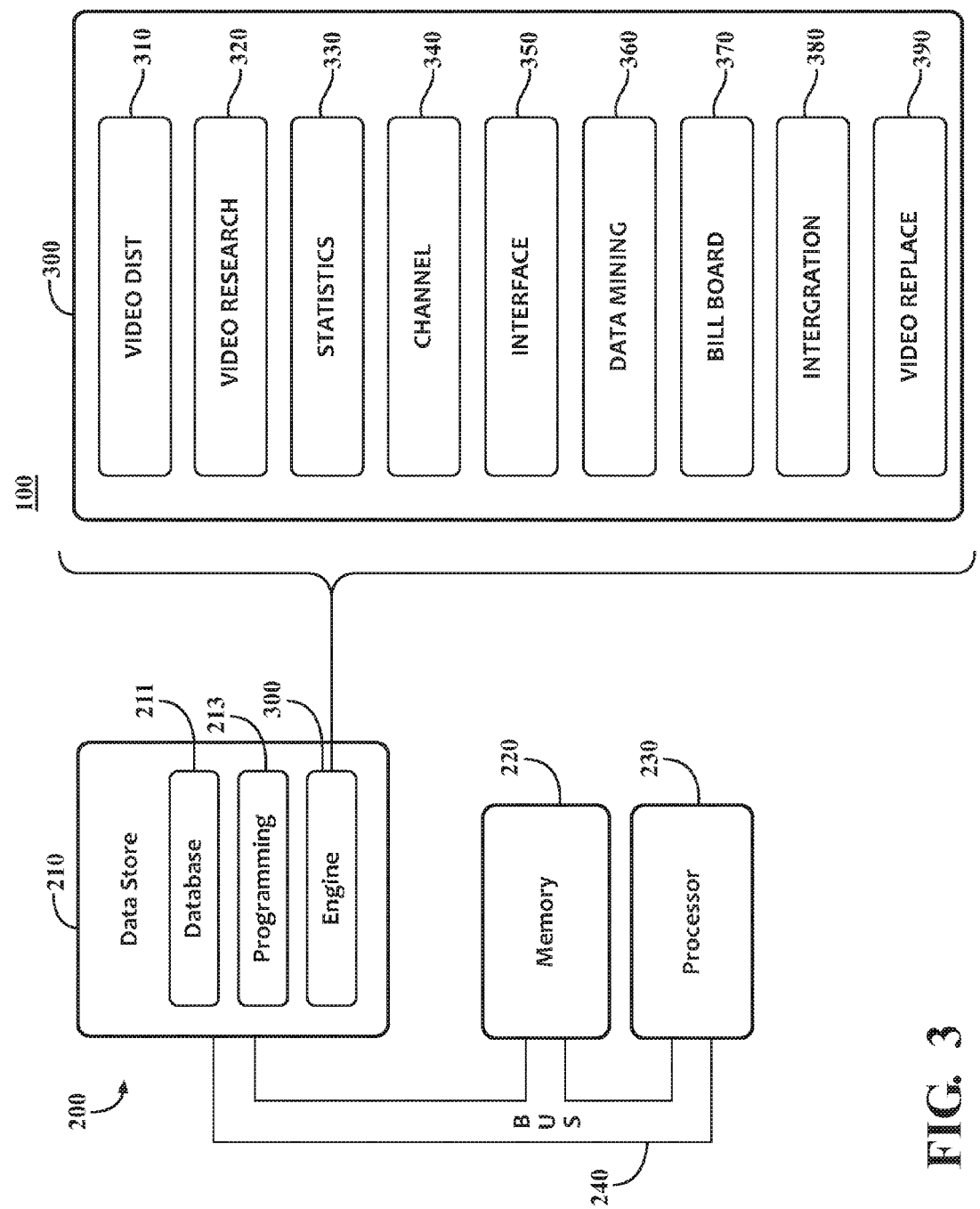
FIG. 3 illustrates an example of a video management and marketing system.

System 100, described in more detail with respect to FIG. 3, includes a video distribution module that supports automatic distribution of augmented videos to a user's Web site(s), the user's social media, and the user's Web 2.0 accounts. The distribution module supports multiple accounts of a user (e.g., the video producer 40) and provides a scheduler module to distribute the user's videos.

Still further, the system 100 provides the following modules/sub-modules:

a video research module that searches other video content distributors to identify candidate videos that may be considered for the user's marketing campaign;

a statistics module that provides real-time statistics and their display as a visual heat map, allowing users to see which parts of the user's videos are being watched, skipped, and replayed, and that tracks call to action activity; the statistics module integrates with other statistics tracking mechanisms, including third-party Web analytics systems, to provide demographic information related to viewers 66;

a search engine-optimized video channel module for organizing the user's videos;

a multi-user interface that allows multiple users to collaborate on video marketing projects at the campaign level;

a data mining module that obtains publicly available data, including Web analytics data, related to the viewer 66;

a live billboard module that provides video message and data streaming for distributed videos;

an interactive menu module that allows users to link different campaigns and channels together to provide an interactive menu and thereby allow viewers 66 to access other campaign videos and channel videos in the same video player through a simple menu selection; and a distributed video content replacement module that allows users to replace distributed videos with updated versions of the video in a simple, global process.

These and other features and aspects of the video management and marketing system 100 are described in detail below and are illustrated in FIGS. 2A-8.

FIGS. 2A-2E illustrate example Web pages implementing aspects of call to action functionality presented to viewers 66. However, as noted above, the call to action functionality (and videos) may be provided to viewers 66 through other distribution means.

Figure 2A:
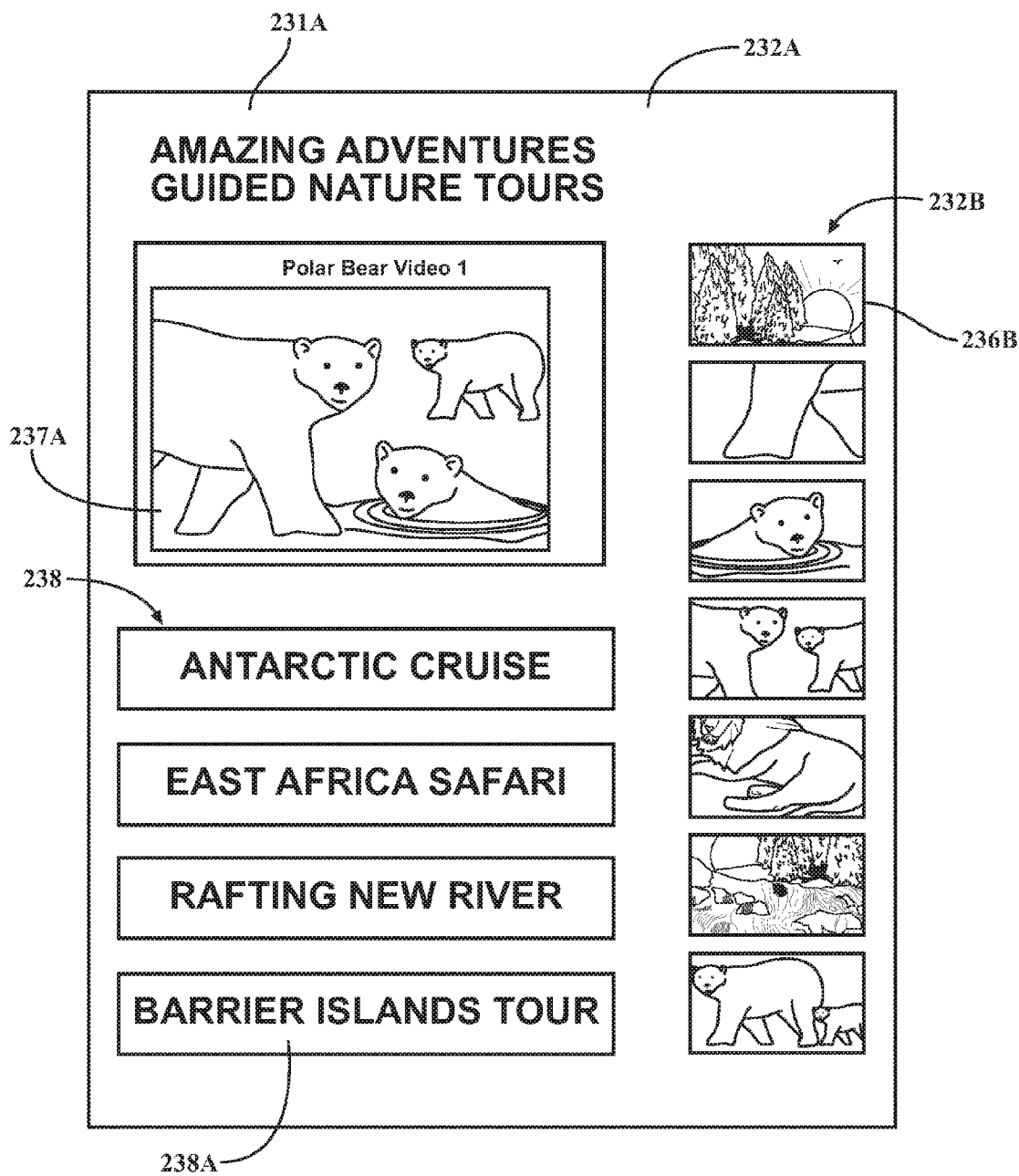
FIGS. 2A-2E illustrate example video pages implementing features available through a video management and marketing system as disclosed herein with respect to FIG. 3.

FIG. 2A illustrates a Web page 231A for a travel service. The Web page 231A includes in box 232A, the identity of the travel service, Amazing Adventures, and the subject of the page, namely Guided Nature Tours. Also shown is a polar bear video 237A playing in a video player, and a thumbnail section 232B illustrating thumbnails 236B of other travel videos that may be played. The polar bear videos may be arranged in a channel created by the travel service, and illustrate aspects of the travel service's guided polar bear tour in Churchill, Manitoba. Section 238 of the page 231A includes channels, and a view of related thumbnails, for other guided nature tours provided by the travel service.

Before, during, or after playback of the polar bear video 237A, a viewer 66 may be presented with one or more calls to action that relate to the service's polar bear tour, or to other tours or services and products of the travel service. For example, the viewer 66 may be presented with a call to action to display available tour dates (polar bear season near Churchill lasts about one month, from mid-October to mid-November). Other calls to action may provide for ordering a brochure of the overall tour, information about lodging in and travel to Churchill, clothing requirements, and other information; an email entry form to receive emails related to the polar bear tour or other guided tours; a telephone entry form to receive a telephone call from the tour service; a payment entry form to pay for services; and display of comments from other viewers 66 who went on a polar bear tour, or used other services of the travel service; for example.

When calls to action are displayed during playback of the polar bear video 237A, the calls to action may overlay the playing video 237A in a manner that minimizes obscuring the video. Alternately, the video may pause during display of the calls to action, and the calls to action may persist for a limited time.

Figure 2B:
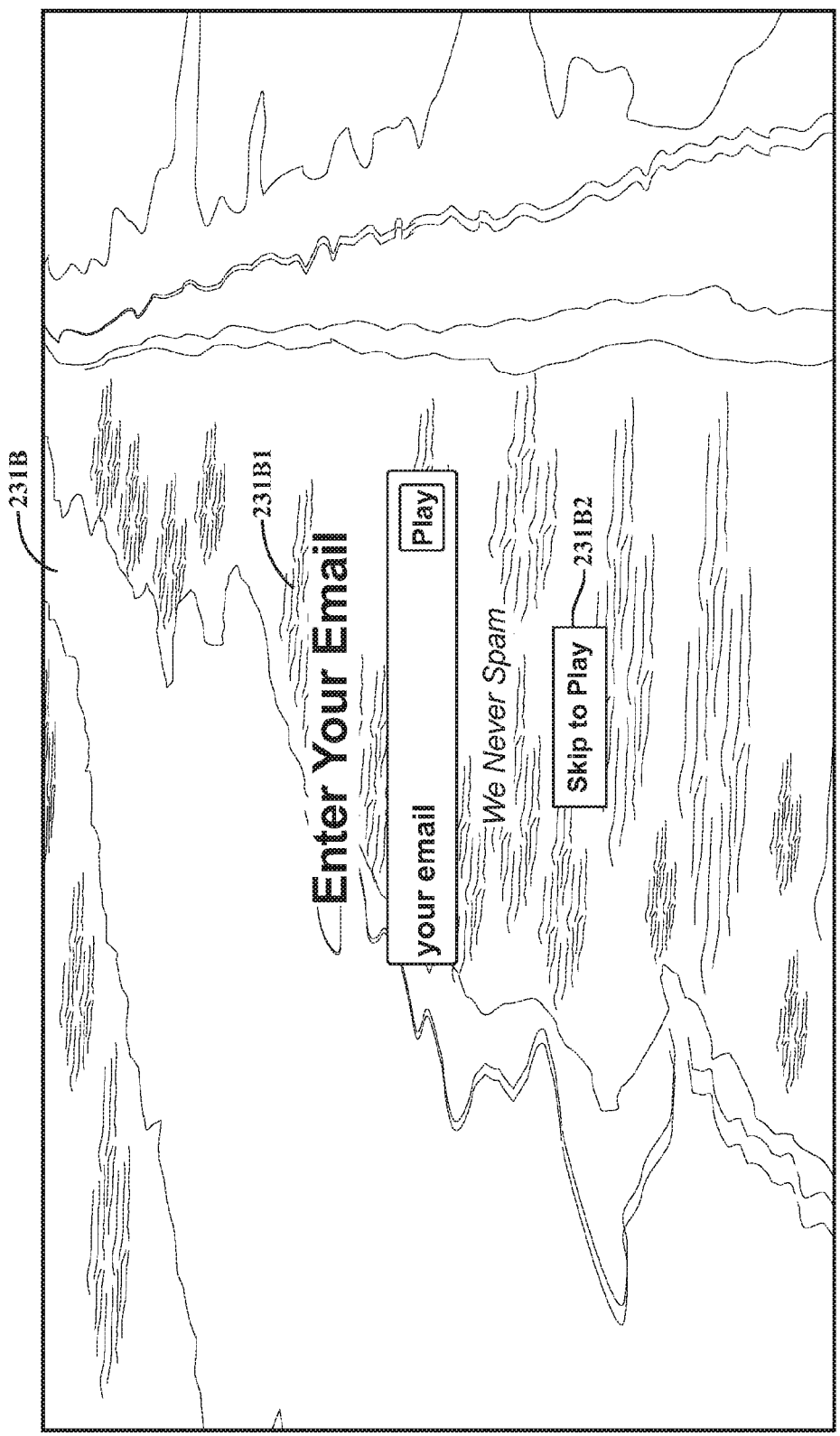

In an embodiment, calls to action may be displayed during video playback but the viewer 66 does not interact with the calls to action until completion of the video playback. For example, a call to action such as shown in FIG. 2B may be displayed but the viewer 66 interaction is disabled until after video playback. In this example, the call to action may display temporarily during video playback and then reappear after video playback ends. In an alternate aspect of this embodiment, the calls to action may display outside the video player but on the video Web page, or may be sent to a separate device of the viewer 66. For example, viewer comments may be displayed below the video player.

In another embodiment, all calls to action may display only after completion of video playback or, as an alternative, if the viewer 66 ends video playback at a point before the normal end of video playback.

In yet another embodiment, if the viewer 66 stops video playback and then resumes video playback at some later time, the calls to action may display after completion of the interrupted video playback.

In an embodiment, a specific call to action, such as entry of an email address, may be presented as a first call to action. Subsequent calls to action may display depending on what action, if any, the viewer 66 takes in response to the first call to action. In another embodiment, all calls to action designated for the video may be displayed in sequence.

These and other aspects of the call to action functionality are illustrated by the examples shown in FIGS. 2B-2E following in which a viewer 66 selects to view videos related to a barrier island tour (238A of FIG. 2A).

FIG. 2B illustrates a video page 231B on which appears a call to action 231B1 associated with the barrier island tour.

Specifically, the illustrated call to action 231B1 overlaying a barrier island video asks the viewer 66 to enter an email address. The overlay also includes a skip to play feature 231B2. As noted above, the call to action 231B1 may be displayed automatically after video playback ends or is stopped by the viewer 66, or may be displayed outside the video player or on another device of the viewer 66.

Figure 2C:
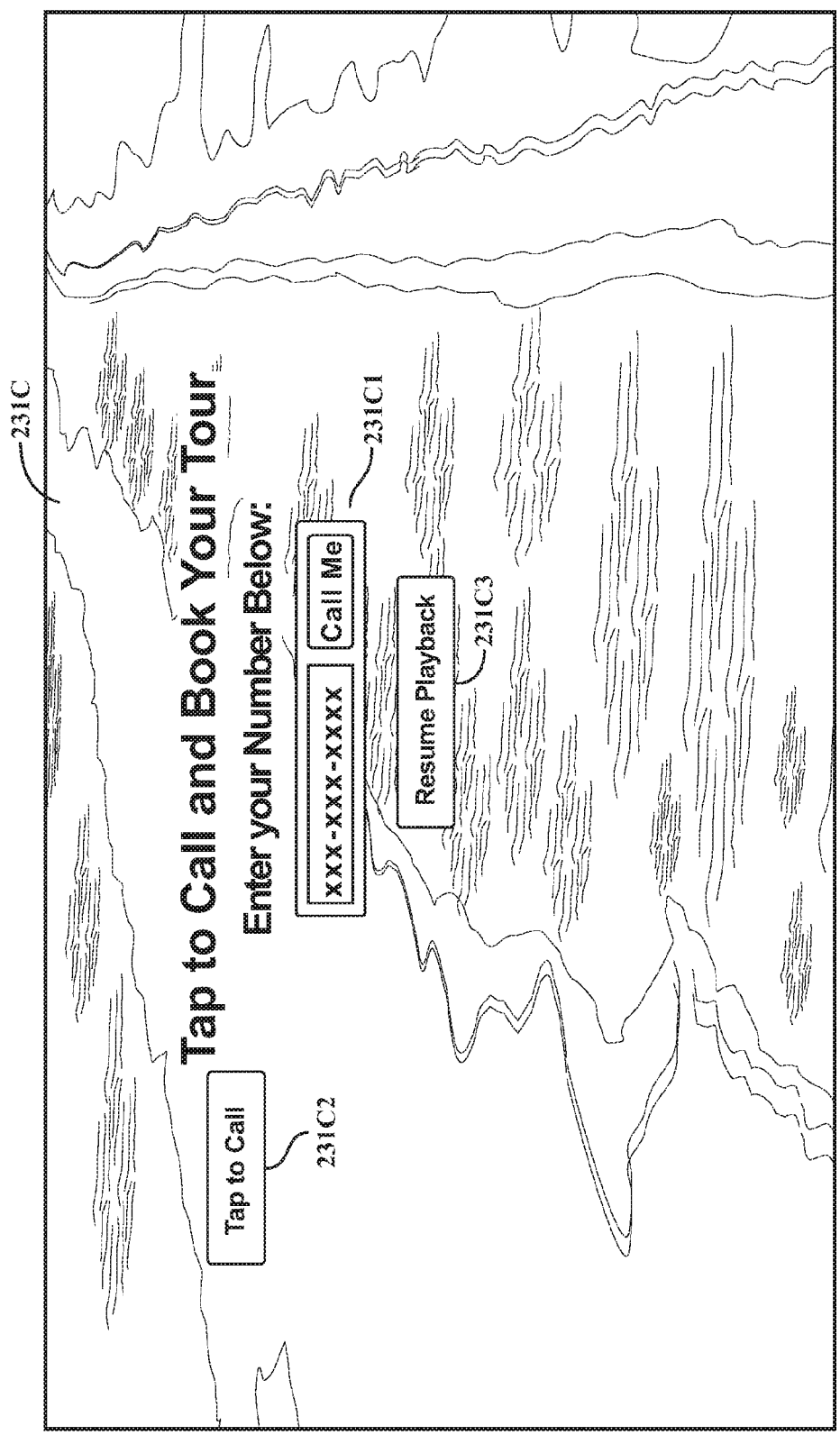

FIG. 2C illustrates a video page 231C in which a call to action 231C1 is overlaid. The call to action 231C1 asks the viewer 66 to enter a telephone number, and the travel service will call the entered number. The overlay also includes a tap to call button 231C2 to directly access the travel service and a resume play button 231C3.

Figure 2D:
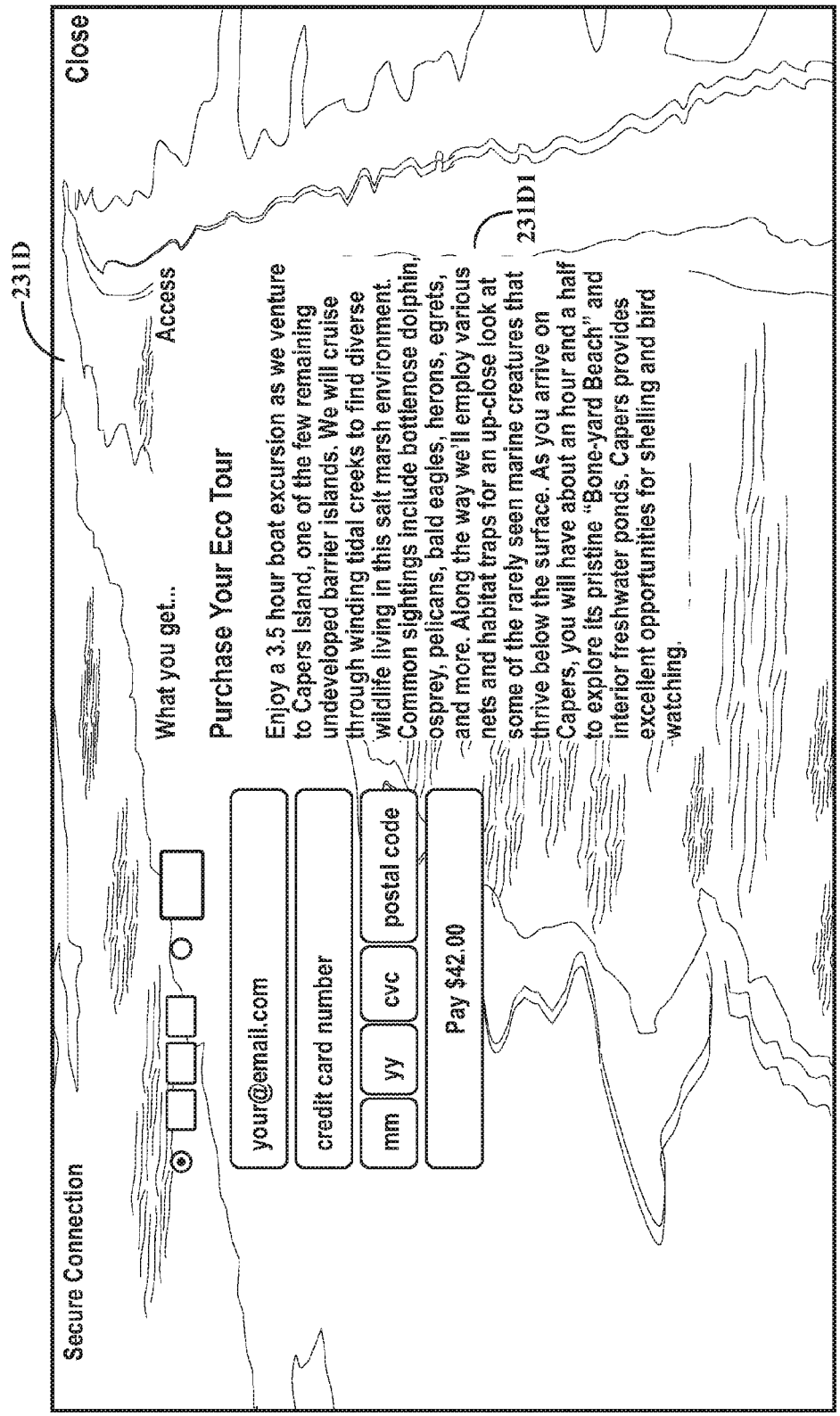

FIG. 2D illustrates a video page 231D with a payment call to action 231D1 that may be used to purchase a barrier island tour. As noted herein, the call to action 231D1 may be displayed automatically upon completion of video playback. In addition, upon completion of video playback, the call to action 231D1 may be displayed at a second location different from the location at which the video was displayed. Thus, the call to action 231D1 may be displayed at a second site different from the first site at which the video is displayed, such as a different Web site, or on another Web page or another tab of the same site, or outside the area of the video player, or on a second device other than the device at which the video is displayed. In an embodiment, the call to action 231D1 may be displayed in an email or in a short message system (SMS) message. In another embodiment, the video may be displayed in a SMS message or an email, and the call to action 231D1 may be displayed at a Web site.

Figure 2E:

FIG. 2E illustrates an email page 231E with a call to action 231E1.

FIG. 3 illustrates video management and marketing system 100 in detail. The system 100 may be implemented on server 94 (see FIG. 1) or another suitable hardware platform. In an embodiment, the system 100 includes hardware components 200 such as data store 210, memory 220, processor 230, and communications bus 240. The data store 210, which includes non-transitory computer-readable storage mediums, provides data base 211, programming 213, and video management and marketing engine 300.

The data 211, programming 213, and engine 300 may be accessed by processor 230, loaded into memory 220 over bus 240 and processed/executed by the processor 230. The processor 230 may generate a user interface (UI) through which various functions of the engine 300 are made available to users, such as the video producer 40 shown in FIG. 1. For example, the UI may provide displays similar to those of FIGS. 4A-4J, and further may provide pull down menus, or other lists, of controls, commands, and features from which the user may select, and other features, windows, dialog boxes controls, and displays.

Video management and marketing engine 300 includes video distribution module 310, video research module 320, statistics module 330, video channel module 340, user interface module 350, data mining module 360, billboard module 370, integration module 380, and video replacement module 390.

The video distribution module 310 distributes videos identified by a user to one or more accounts or sites. The videos initially may reside on a video hosting site such as the video delivery system 20, and may be organized in the video hosting site in one or more channels. The videos may be imported to system 100, may be arranged in one or multiple campaigns, and may be augmented with one or more specific calls to action. The video distribution module 310 then distributes the augmented videos to accounts or sites as designated by the user.

The video research module 320 searches other video content distributors to identify candidate videos that may be considered for the user's marketing campaign. The search may be automatic based on content of videos imported by the user to the system 100. Alternately, or in addition, the user may execute a manual search using the video research module 320. The user then may include those videos in the user's campaign or one of the user's video channels.

The statistics module 330 provides real-time statistics and their display as, for example, a visual heat map (see FIG. 4A), allowing users to see which parts of the user's videos are being watched, skipped, and replayed, and that tracks call to action activity. The statistics module 330 also integrates with other statistics tracking mechanisms to provide demographic information related to viewers 66. Statistics are garnered in three areas: viewer information, individual videos, and call to action activity. Viewer information includes geography, location of the video being watched (Blogger, Web site, etc.), name, email address, social profile information, and the device and browser being used. Video information includes percentage of the video actually watched, full screen or embedded, heat map, video watching (skipped, paused, reviewed), and most-viewed location. Call to Action (CTA) activity includes number of views, number of clicks (actions) for each call to action, number of calls to action skipped, mobile versus computer activity, video location (Facebook, Blogger); and user activity over time.

The search engine-optimized video channel module 340 analyzes the user's video channel and makes suggested changes to improve the channel's visibility in searches conducted through various search engines.

The interface module 350 allows multiple users to collaborate on video marketing projects at the campaign level. The interface module 350 generates a user interface (see example pages in FIGS. 4A-4J).

The data mining module 360 receives viewer entered data such as an email address or telephone number, or other information (e.g., entered through a call to action) that may serve as a starting point for searching publicly available information. The data mining module 360 also determines the identification of the site at which the viewer 66 viewed a video and activity information associated with that view (clicks, re-watches, skips, etc.). The data mining module 360 includes search features that search social media, Web 2.0 accounts, analytics sites, and other sites and collects publicly available information, including, for example, images, mailing addresses, and business and professional information. The module 360 also collects available demographic data, geographic location (using for example, the viewer's IP address, browser language, make and model of media device). The data mining module 360 may set a tracking cookie to record all activities by the viewer 66. The module 360 creates a viewer account and stores the above-noted data in the file in data base 211. The module 360 creates a viewer profile using, for example, contact APIs. The module 360 updates the viewer's profile based on subsequent interactions between the viewer 66 and the videos distributed through the system 100. In addition, the module 360 determines referrer information and site associated with a specific video view by, for example, parsing request headers. Finally, the module 360 makes certain of the viewer data available to a user's corresponding services. For example, the viewer's email address may be made available to a user's email account; sale information may be made available to the user's accounting services, etc.

The billboard module 370 provides video and text message streaming for distributed videos. The module 370 relies on feed URLs entered by a user and stored in a user account in the data base 211. The calls to action selected by the user are integrated by the system 100 with the user-designated feeds. As part of this process, the user designates types of posts from feed that may appear with the videos. Note that the feeds may be changed in real-time. As noted above, the module 360 tracks and reports views and interactions including interactions with posts on a video. When an embed code is loaded anywhere on the Internet, based on unique ID of embed code, the system 100 determines what video to show and what calls to action to show. If call to action has a live feed call to action, the billboard module 370 determines what text, images, and data to show, depending on the source of feed. For example, if the feed is a social network feed, the system 100 uses the API of the social network to fetch the user's latest posts; if the feed is a RSS feed from a blog, the system 100 uses that RSS feed to determine what to display.

The process of the module 370 is data base driven. User accounts and associated feed information are stored in data base 211, and each user is assigned a unique embed user ID (e.g., as an element of an embed code). The embed user ID/embed code is associated with the user rather than an individual video. By having the embed user ID, all updated information can be instantly distributed to the correct deployed videos.

The integration module 380 allows users to link different campaigns and channels together to provide an interactive menu and thereby allow viewers 66 to access other campaign videos and channel videos in the same video player through a simple menu selection.

Distributed video content replacement module 390 allows users to replace distributed videos with updated versions of the video. To begin, a user imports an updated video(s) from a video hosting account. The system 100 automatically adds the uploaded video from the hosting account channel. The user then adds the new video to the desired campaign and checks or changes the calls to action placement(s) on the new video. The user clicks a Replace Video Button and all currently distributed videos are replaced in real-time, preserving interactivity using the same deployed video embed code. Each embed code provided by the system 100 has a unique identification (ID), e.g., qwerty123. The system 100 maintains, in data base 211, a mapping of the video corresponding to that unique ID. All calls to action also map to the same unique ID in data base 211. When the user replaces the video corresponding to the unique ID, only the video changes and the changed video displays the previous calls to action, subject to any user call to action edits or updates, which updates are stored in the data base 211. Since the calls to action are attached to a unique ID and not to the video file, changing the video file while keeping the unique ID intact keeps the calls to action intact.

FIGS. 4A-4J illustrate example pages of a user interface (UI). Through these pages, a user:
1. Creates a project;
2. Creates campaign(s) for the project;
3. Adds videos to a campaign;
4. Adds calls to action (CTAs) at the campaign level—the CTAs may be added in bulk to all videos in campaign;
5. Adjusts CTA placement on video(s) for added precision if desired;
6. Schedules deployment of videos to Web sites, social media, and Web 2.0 sites;
7. Views a calendar for deployment schedule in aggregate;
8. Checks statistics for campaign results;
9. Modifies and redistributes updated videos to deployment sites if desired; and
10. Repeats the process for other campaigns or adds new videos to existing campaigns.

Figure 4A:
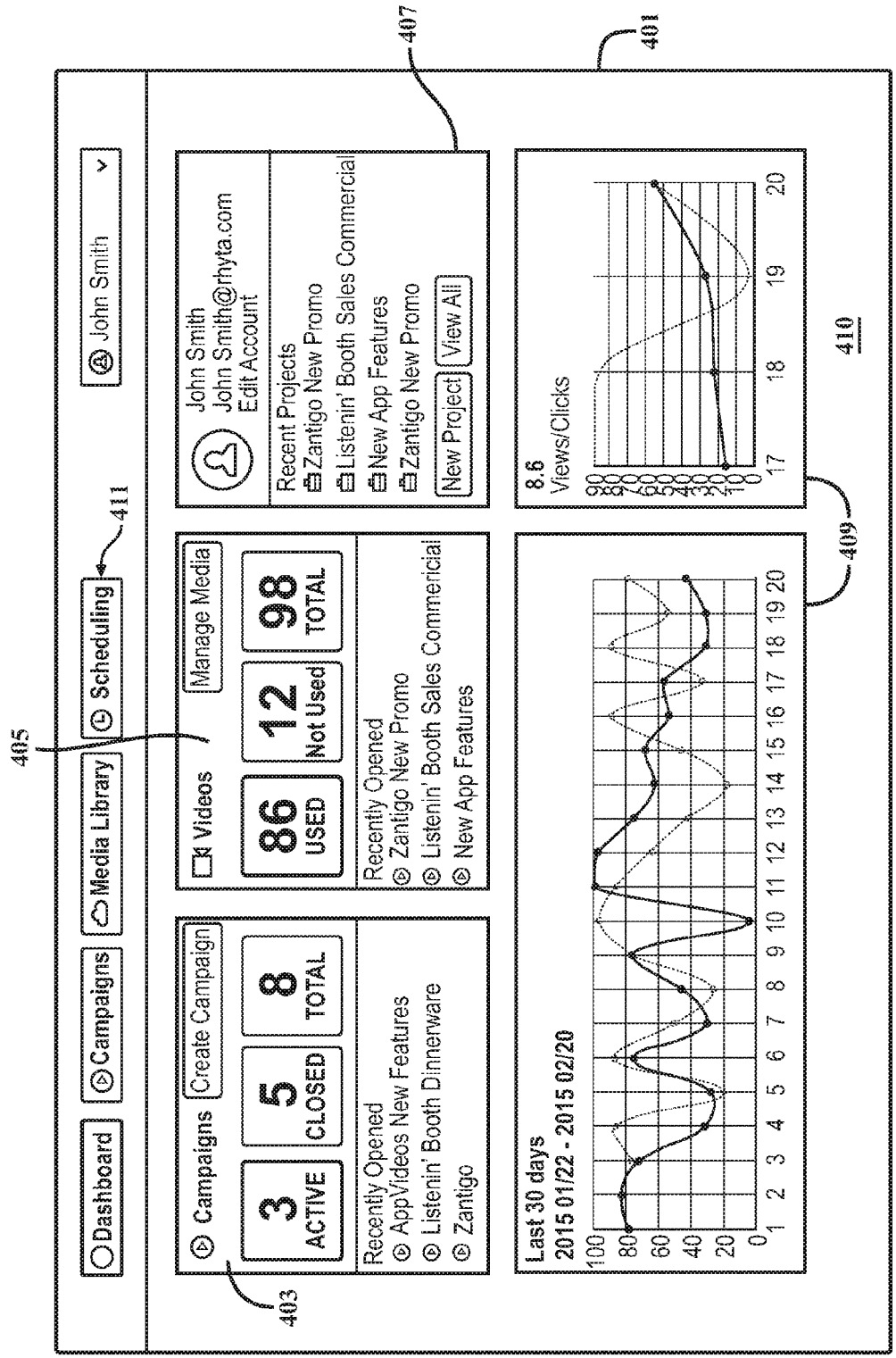

FIG. 4A illustrates an example user interface 401, with a dashboard tab selected to provide a dashboard 410. In an embodiment, the dashboard 410 may be presented to a user as a dashboard page when the user logs into the system 100. The dashboard 410 presents data related to the user's account (which may be stored in data base 211), including the number of active and closed campaigns 403, number of used and unused videos 405, recent projects 407, and performance metrics 409. The dashboard 410 also includes various soft buttons that the user may select to view other aspects of the user's campaigns, videos, and projects. For example, the dashboard 410 includes main menu 411, which in turn, includes tabs for selection of dashboard, campaign, media library, and scheduling. Through the main menu 411, the dashboard 410 allows a user to add new projects and campaigns. The main menu 411 shown in FIG. 4A also may be presented in other pages, as can be seen in FIGS. 4B-4J.

Figure 4B:
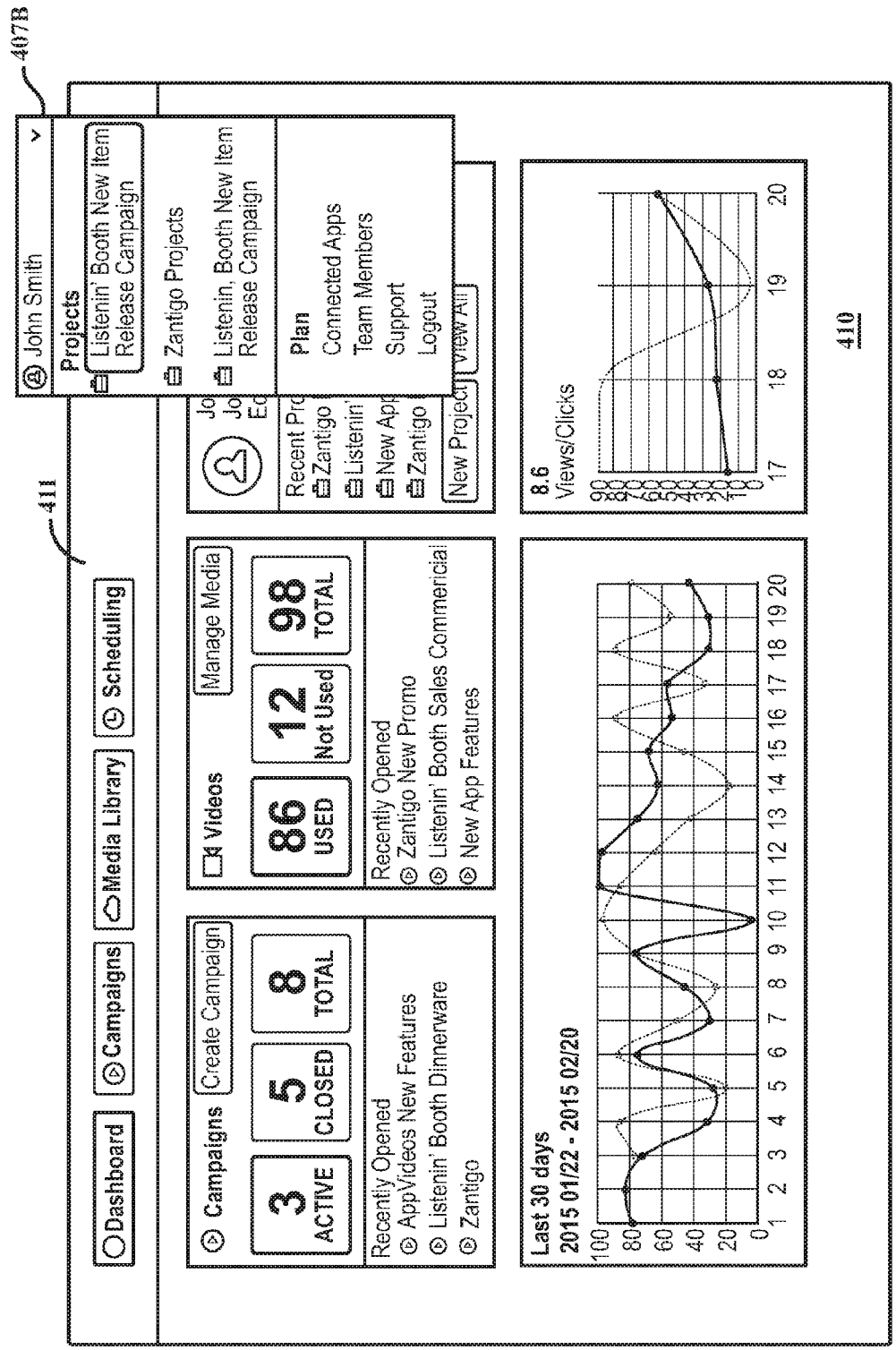

FIG. 4B illustrates the dashboard 410 with a specific project menu 407B selected from the recent projects menu. The information presented for the selected project includes details related to a specific augmented video plan purchased by the user through the system 100. The specific project menu 407B also allows the user to add user credentials for applications the user wishes to integrate, such as the user's email service, add team members, and contact system 100 to resolve technical issues.

FIG. 4C illustrates a campaign page 420 of the user interface 401. The campaign page 420 allows users to import videos from video hosting sites into the system 100. The campaign page 420 also allows users to create a new campaign, manage existing campaigns, and add additional videos to an existing campaign.

Figure 4D:
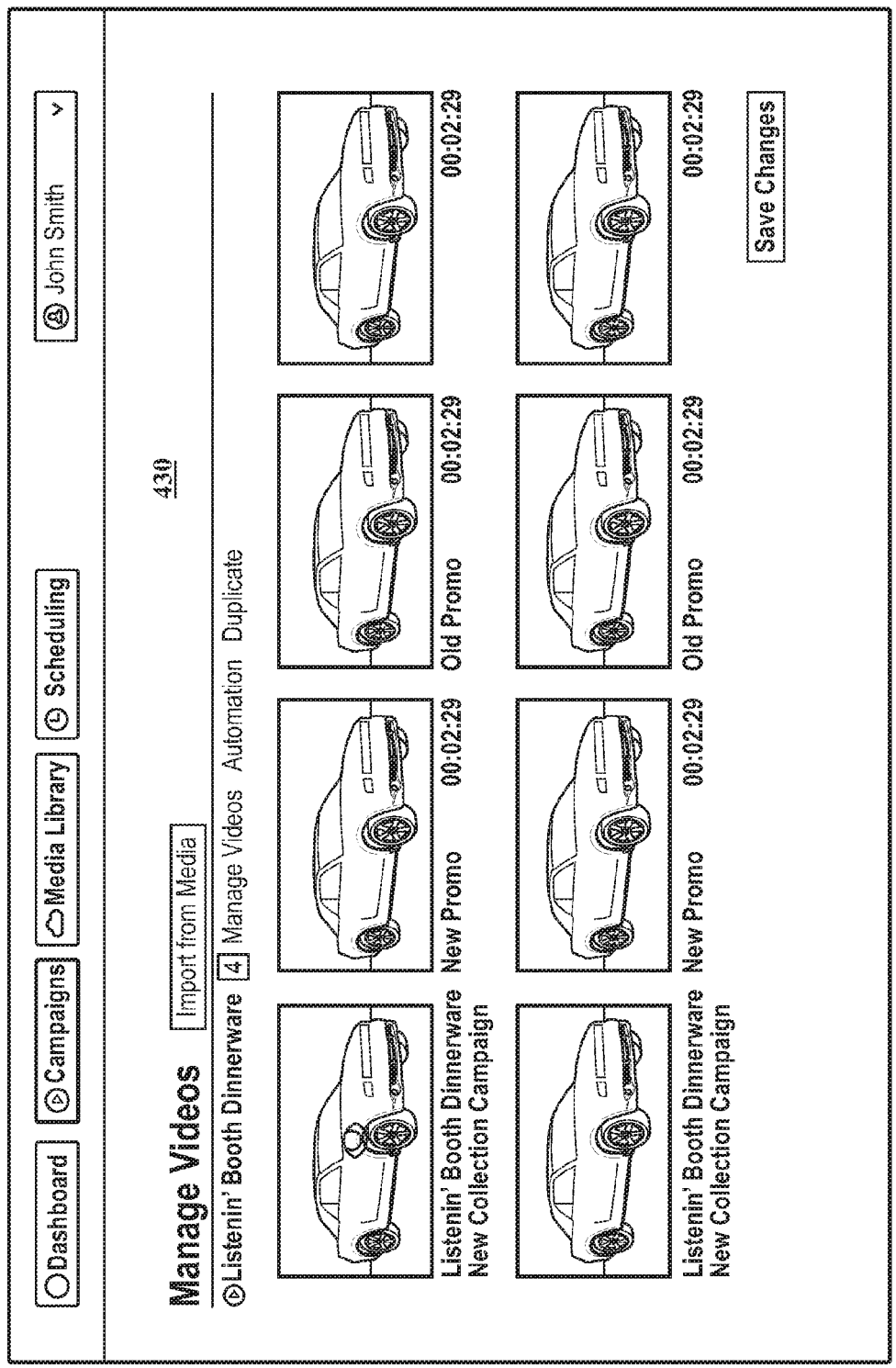

FIG. 4D illustrates campaign page 430, which may be displayed when a user elects to open an existing campaign or add videos to a new campaign. The campaign page 430 shows the existing videos in the campaign. One option for displaying the videos involves displaying thumbnail images derived, for example, from the videos. Additional pages may be accessed by scrolling or selecting additional tabs, should the number of videos exceed the display capacity of the user's hardware device. For example, if the user accesses the campaign page 430 from a mobile device such as a smartphone, the page 430 may display fewer videos per tab than would be displayed on a laptop computer.

Figure 4E:
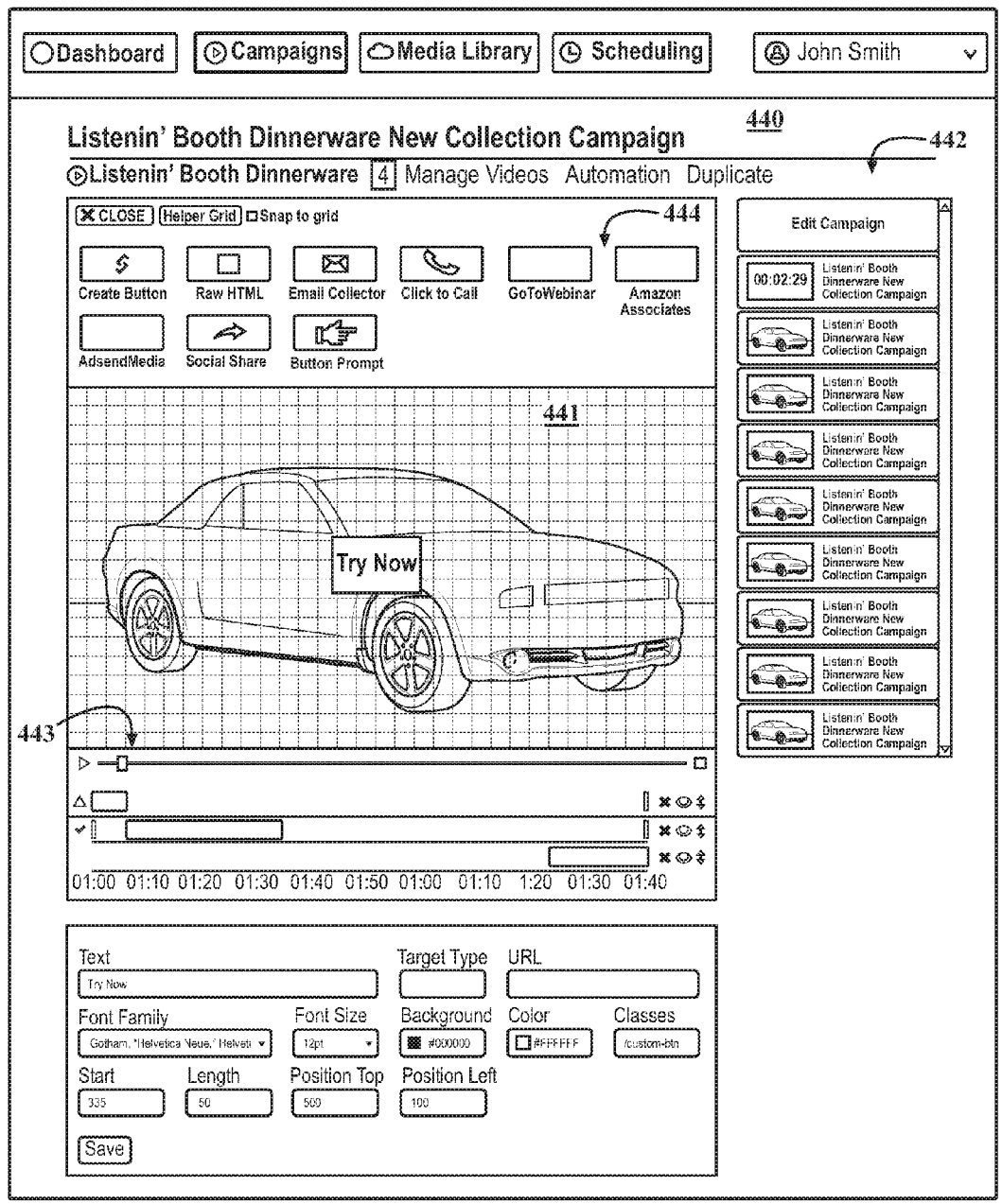

FIG. 4E illustrates a campaign page 440 with an individual video displayed in a display work area 441. When a user either opens an existing campaign or adds videos to a new campaign, the videos assigned to the campaign are displayed in section 442 of the page 440. By clicking on a video in section 442, the desired video is displayed in the work display area 441.

From a call to action (CTA) button selection displayed above the displayed video, users can drag the desired CTAs (one or more) to the video. The CTAs appear as buttons 444 and the user can drag the button to the desired location on the video. Each CTA also appears as an individual timeline 443 below the video. Users then can drag the ends of the timeline 443 to make the CTA appear and disappear as desired during video playback. Below the timeline, the CTA criteria are displayed. For example, if the CTA is for email capture, and the user desirers to use Constant Contact, the user's Constant Contact API/login information (i.e., service credentials) will appear. If another CTA timeline is selected, the associated user service credentials will appear. A user only has to add user service credentials once. The system 100 displays all the information associated with the service. The user, for example, may select a desired Constant Contact list from a drop down menu.

The user may user the features of the campaign page 440 to associate specific features with the CTA. For example, the user may specify the CTA appear as an overlay to the video, as grayed out until selected, as having a pause video feature whereby selection of the CTA pauses the video, as having a save for later feature whereby the CTA is displayed at a later time (e.g., after the video ends or is stopped by the viewer 66), a different device feature whereby the CTA is displayed on a device other than that on which the video is playing (e.g., the CTA is displayed on the viewer's smartphone and the video is displayed on a laptop computer), among other features.

Figure 4F:
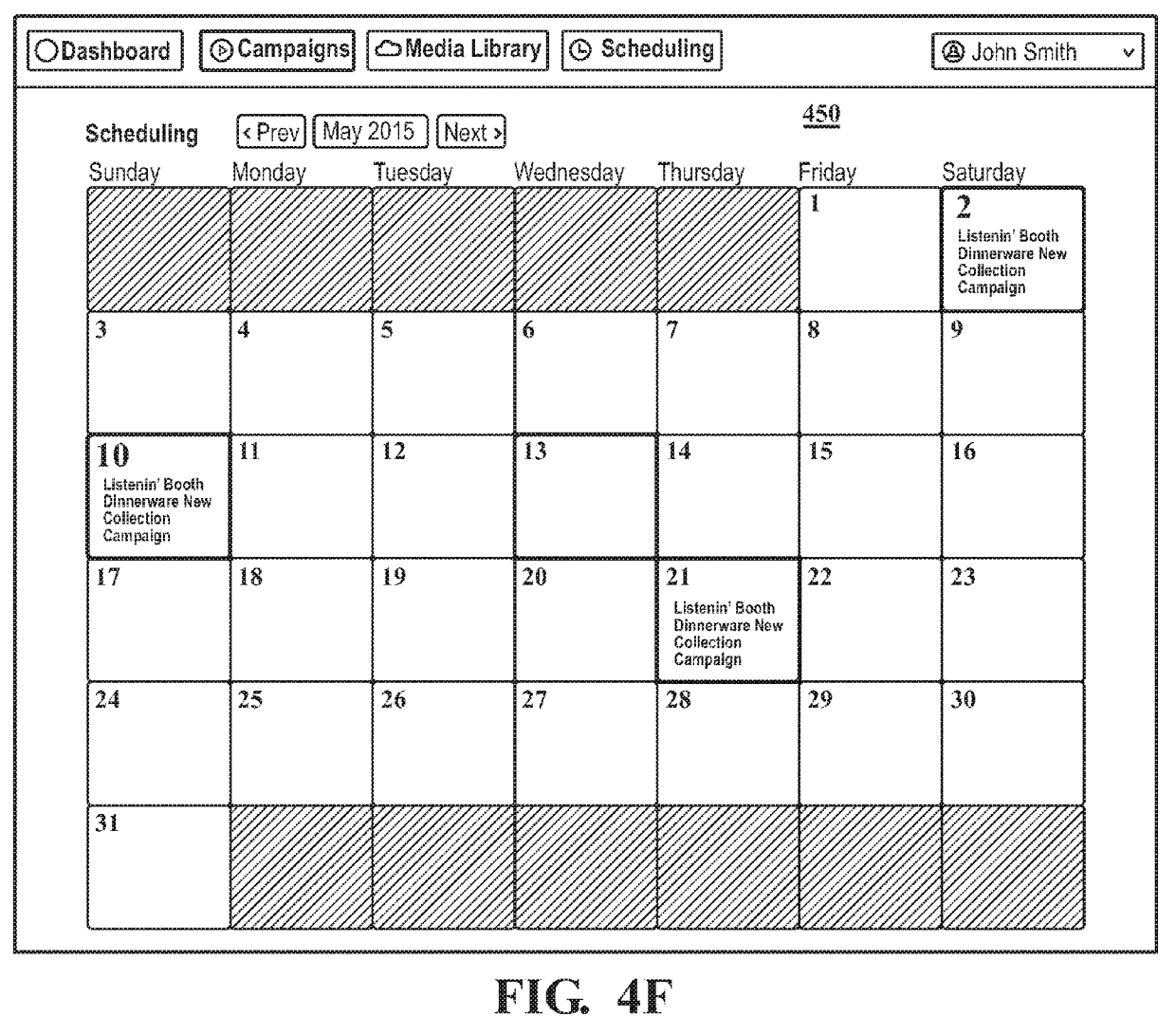

FIG. 4F illustrates a calendar page 450 under the campaign tab. Once the videos are scheduled for deployment, the user is provided with a calendar that represents the schedule. If the schedule is changed, the updates are automatically added to the calendar.

Figure 4G:
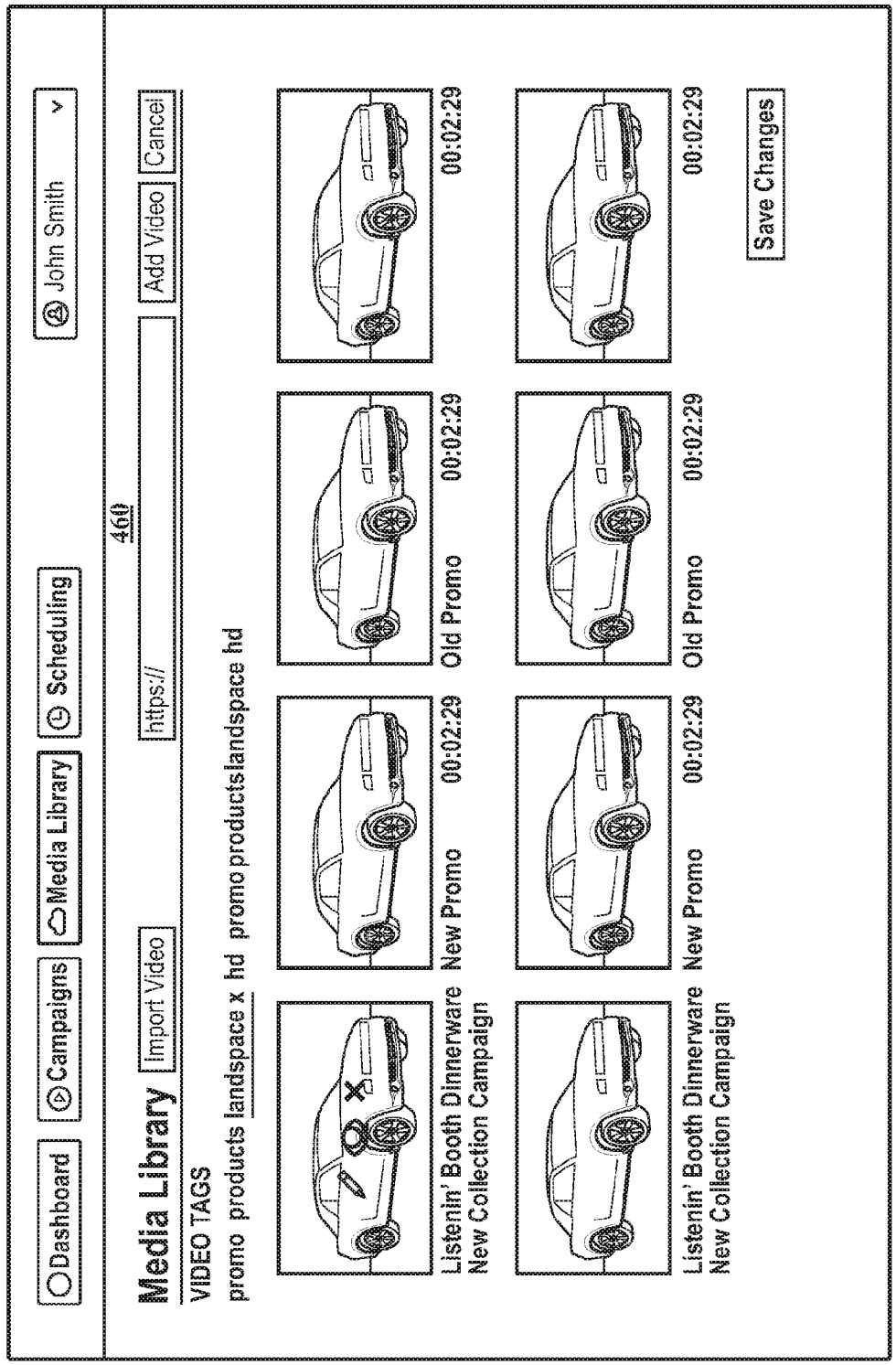

FIG. 4G illustrates a manage video page 460 from the media library tab. Videos can be imported from page 460 and added to a campaign by clicking to select the desired videos. Also, campaigns may be duplicated, if desired, to use the same videos with different calls to action.

Figure 4H:
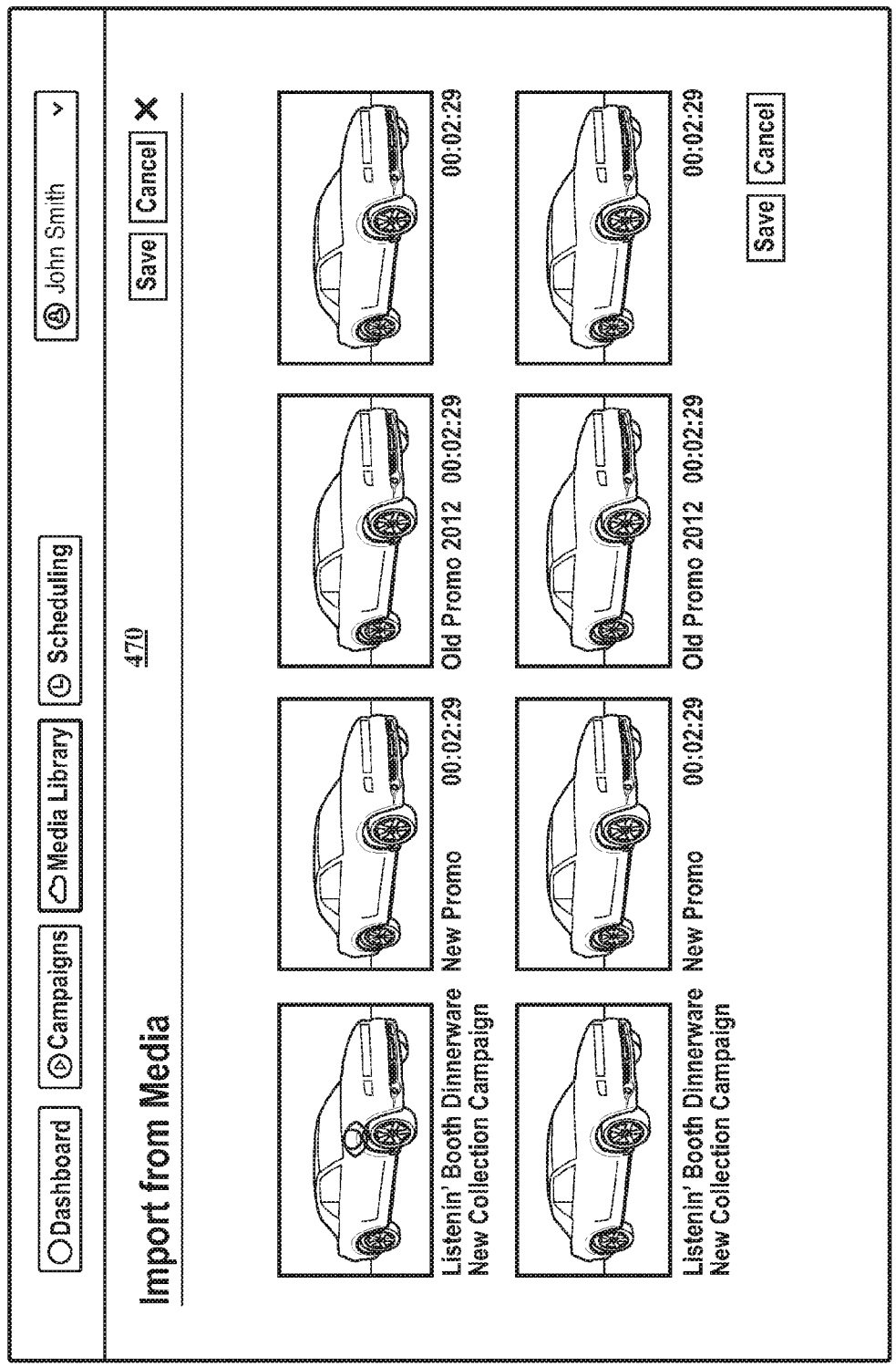

FIG. 4H illustrates an import video page 470 from the media library tab. The page 470 allows users to import their desired videos from third party hosting accounts. Videos may be imported both individually and/or in bulk by channel from any supported video hosting account. Also, a user may search for other videos and add those videos to the user's campaign.

FIG. 4I illustrates an edit video page 480 accessed from the media library tab. On the edit video page 480, users can add search engine optimized (SEO) tags (e.g., title, description, and keywords) to each video. By default, the system 100 imports existing SEO tags added on the video hosting site. Users have the option to use the default SEO tags or to edit or change the default SEO tags.

Figure 4J:
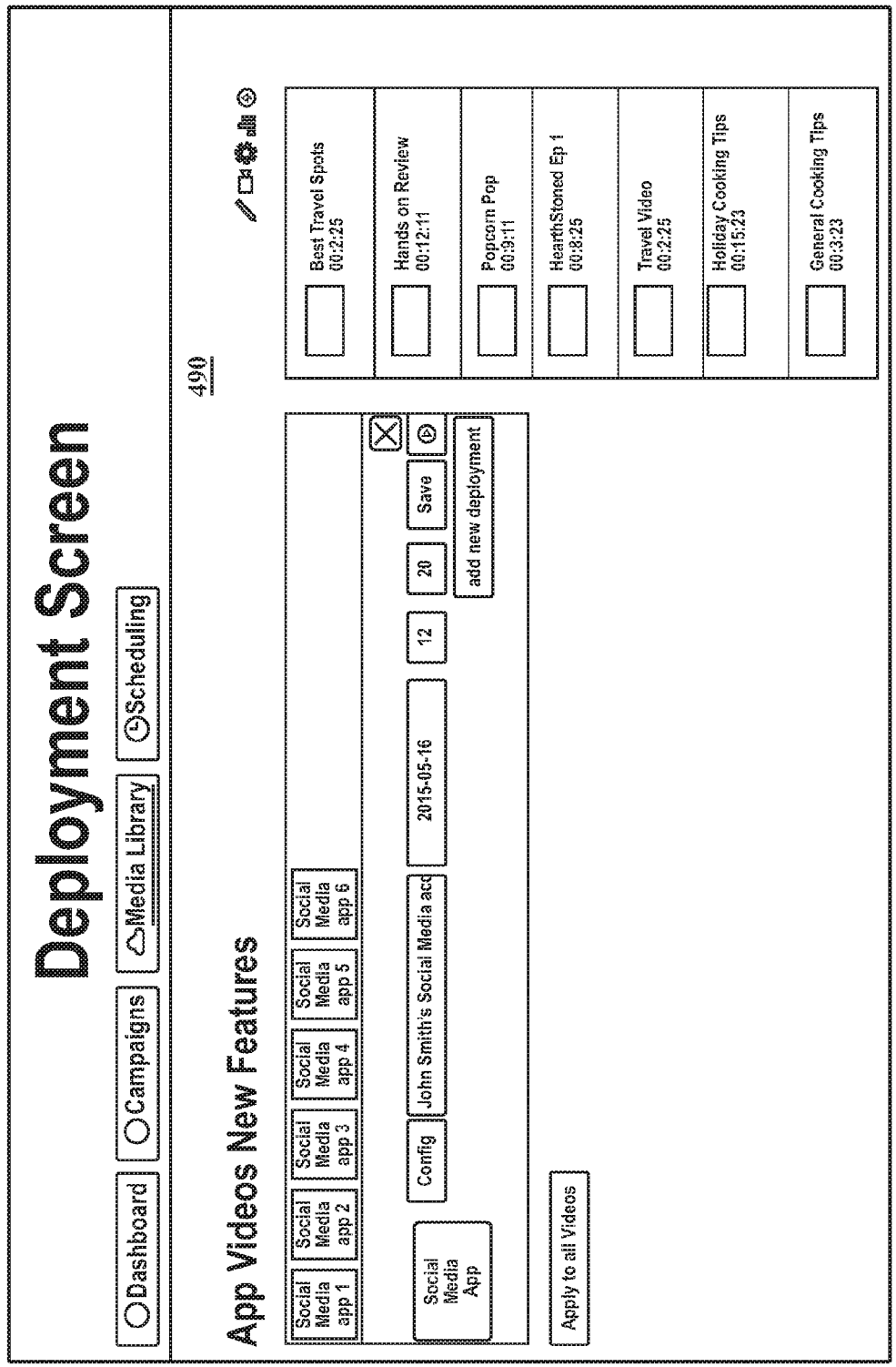

FIG. 4J illustrates deployment page 490. The deployment page 490 may be available through an Automation link in the campaign tab above the video. Users may add multiple accounts to distribute their videos including WordPress blogs (both private and public), social media accounts and Web 2.0 properties. Users enter their log-in credentials once and multiple accounts are supported. The deployment for each video is scheduled and the system 100 automatically adds the video deployment to the campaign calendar. The system 100 then automatically distributes the interactive videos using the user's system 100 embed code to the desired sites. Additionally, text article content may be added for display both above and below each distributed video.

FIGS. 5-8 are flowcharts illustrating example methods for creating, uploading, and displaying videos using the video management and marketing system 100 of FIG. 3.

Figure 5:
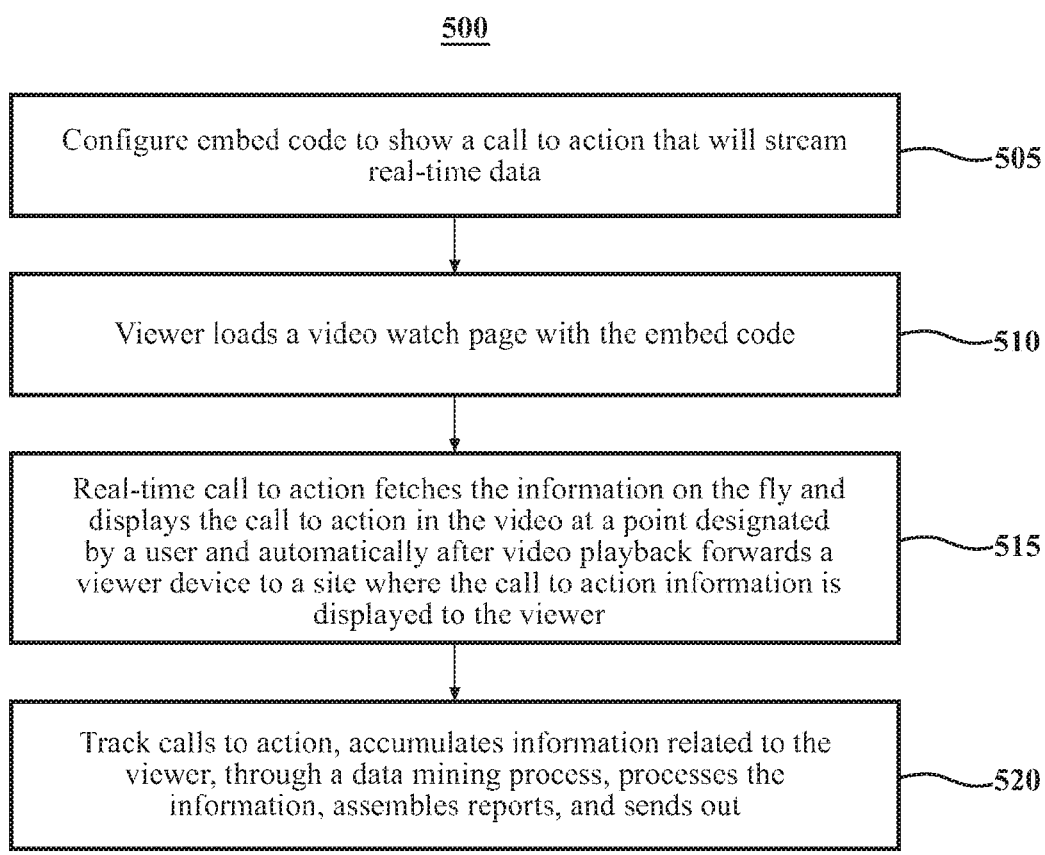

FIG. 5 illustrates an overall process for improving the management and marketing of a user's videos.

In block 505, the processor 230 executes the video management and marketing engine 300 to configure embed code to show a real-time call to action that will stream real-time data in one or more of the user's videos. That is, the processor 230 configures a user-unique embed code that links a real-time call to action to a video.

In block 510, viewer 66 loads a page with the embed code and begins watching the corresponding video. In an aspect, a media device of the viewer 66 will detect, during video playback, the embed code, signals the processor, 230 that the call to action has been reached.

In block 515, the real-time call to action fetches the information on the fly and displays the call to action in the video. For example, the processor 230 fetches the information and causes display of the call to action in real time or near real time when the call to action is scheduled to appear relative to the display time of the video. In an embodiment, the call to action is displayed at a time and location relative to the video playback such as not to interfere with the viewer's video viewing experience. In an aspect, the processor 230 causes the video to be displayed at a first site and upon completion of video playback, automatically forwards the viewer's device to a second site where the call to action information is displayed. That is, in this aspect, the processor 230 receives a signal indicative of playback completion, and without further signal reception, including action by the viewer 66, signals a viewer device to move to or access a second site or location different from the site or location at which the video playback occurred. The processor 230 also may begin a data mining process to collect data and information related to the viewer 66, including information provided by the viewer 66 during the viewing session, such as an email address, a telephone number, a name, an identity of the viewer's browser (when used), and a make and model of the viewer's media device. During the viewing session, and/or at a time after the viewing session, the processor 230 may collect, or cause to be collected, additional information, including the location of the viewing device (based, for example on the IP address or the browser language), and demographic data related to the viewer 66.

In block 520, during the viewing session, the processor 230 tracks calls to action, accumulates information related to the viewing session (clicks, replays, pauses, skips, etc.), through the data mining process. The processor 230 then processes the information and data collected in blocks 515 and 520, assembles reports, and sends out the information and the report to users.

Figure 6A:
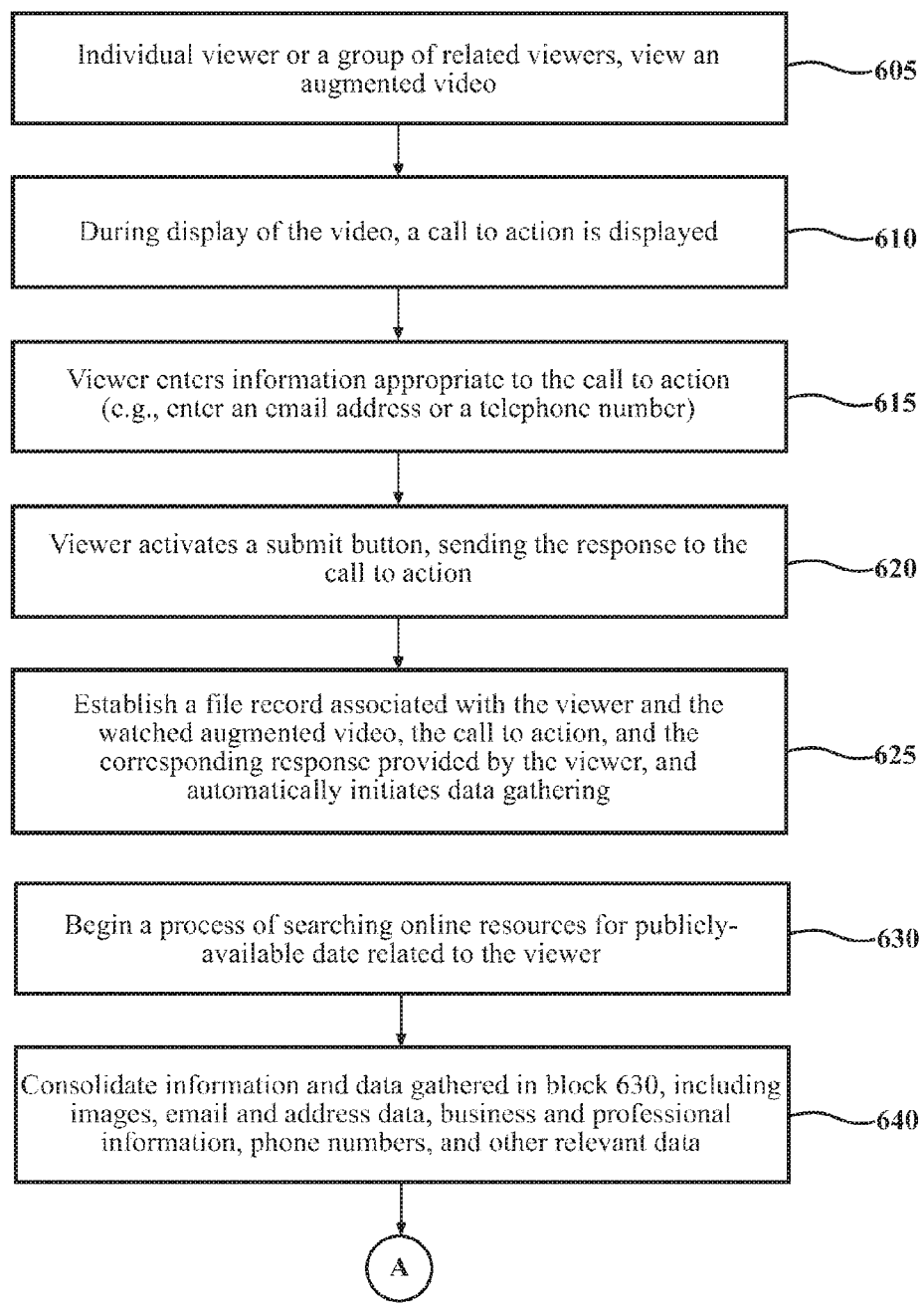
Figure 6B:
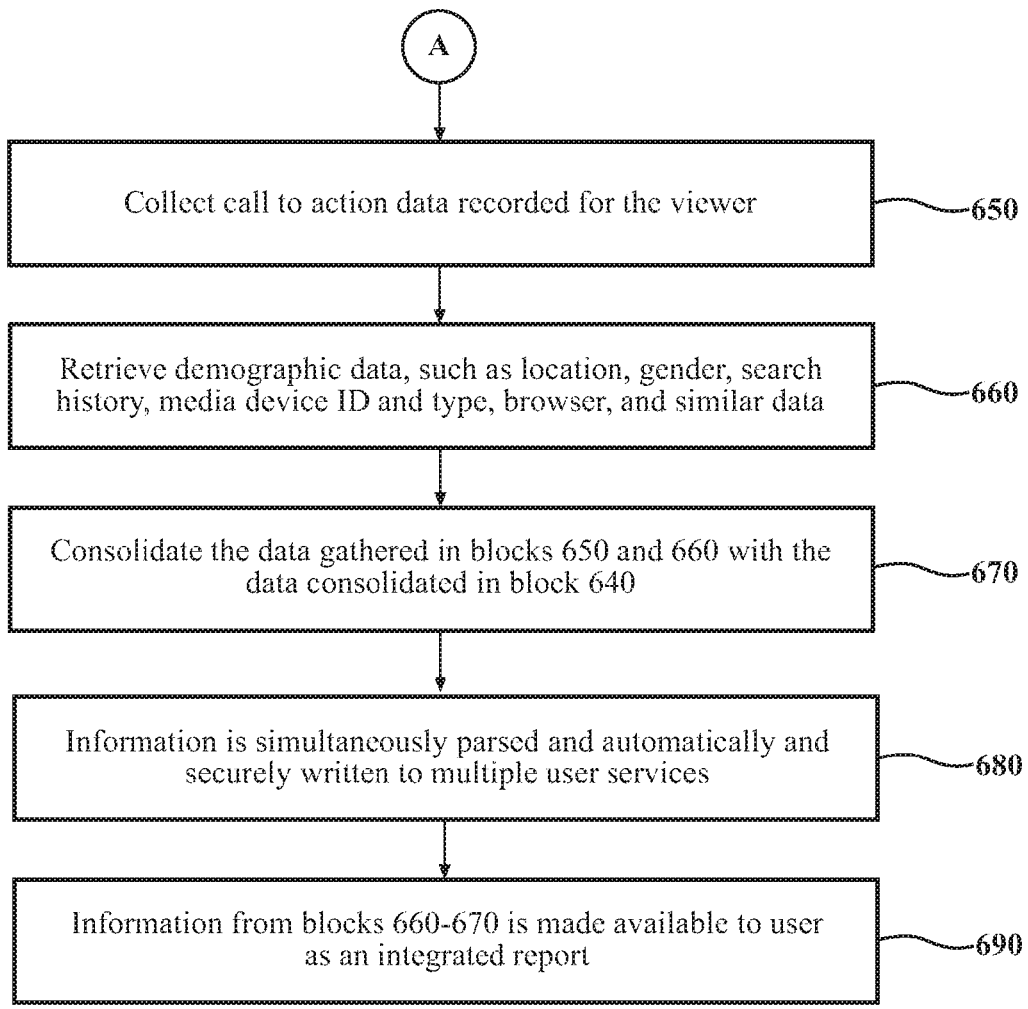

FIGS. 6A-6B illustrate an example data mining process as stated above in blocks 515 and 520 of FIG. 5. In FIG. 6A, data mining process 600 begins in block 605 when an individual viewer 66, or a group of related viewers 66, view an augmented video, wherever that video may be displayed, including, for example, on a Web 2.0 account of a user such as the video producer 40. During display of the video, a call to action is displayed, block 610. The call to action may be displayed as an overlay on the playing video. In an embodiment, the video may pause during display of the call to action. In an embodiment, the call to action may persist until closed by or acted on by the viewer 66. In another embodiment, the video may continue to play until the viewer interacts with the call to action, at which time the video pauses. In still another embodiment, the video may not pause.

In block 615, the viewer 66 enters information appropriate to the call to action (e.g., enter an email address or a telephone number, purchase a product or service, request additional information, etc.). In block 620, the viewer 66 activates (clicks on) a submit button, sending the response to the call to action to the video management and marketing engine 300.

In block 625, the processor 230 executes the engine 300 to establish a file record and viewer profile associated with the viewer 66 and the watched system 100 video (including the video's unique ID), date and time of viewing, length of the viewing session, referrals from other sources to the video (e.g., by parsing request headers), the call to action, and the corresponding response provided by the viewer 66, stores the file record in the data base 211, and automatically initiates information and data gathering through appropriate modules, principally the data mining module 360. The data gathering process involves at least two parallel paths, namely, gathering publically-available data recorded on or residing at online resources, and data available by, for example, third party Web analytics as well as call to action activity recorded by the processor 230 during a viewing session. In block 630, the data mining module 360 executes to begin a process of searching online resources for publically-available date related to the viewer 66. Such online resources include, for example, search engine records, social media, Web 2.0 accounts, and public Web sites. The data mining module 360 consolidates (block 640) information and data gathered in block 630, including images, email and address data, business and professional information, phone numbers, and other relevant data.

In block 650, the data mining module 360 collects call to action data recorded for the viewer 66 as well as viewing data such as clicks, pauses, replays, skips, and other data. In an embodiment, the processor 230 executes the engine 300 to set a tracking cookie with the viewer's media device. In block 660, the data mining module 360 retrieves demographic data, such as location, gender, search history, media device ID and type, browser, and similar data. The data mining module 360 may record the viewer's IP address, browser language, and other geo-location data including location data presented through a GPS or cellular system.

In block 670, the data mining module 360 converts and consolidates the data gathered in blocks 650 and 660 with the data consolidated in block 640. For example, the module 360 may use an API to convert IP address information into a location. The data ten are saved in the data base 211 with the viewer's file record and profile In block 680, the data and information consolidated in block 670 is simultaneously parsed and automatically and securely written to multiple services as designated by the user, including leads to sales automation services, sales and accounting services, etc.

In block 690, the information produced from blocks 660-670 is assembled and reported to the user.

The process 600 then ends.

Figure 7:
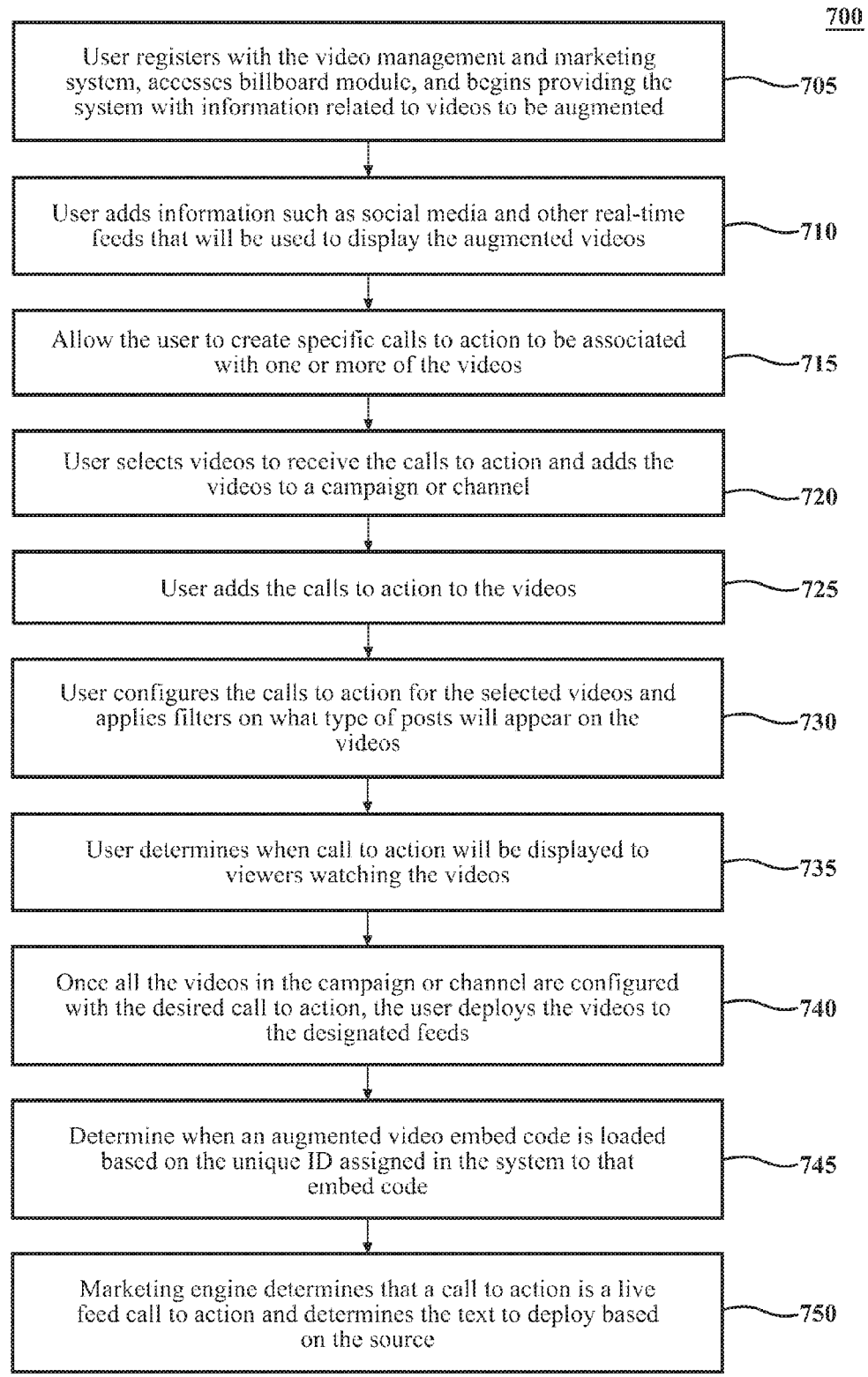

FIG. 7 illustrates an example process for configuring videos as an augmented videos including addition of live feed calls to action, and monitoring and responding to calls to action. In FIG. 7, process 700 begins in block 705 when a user registers with the video management and marketing system 100, accesses billboard module 370 through the user interface (UI), and begins providing the system 100 with information related to videos to be augmented. In block 710, the user adds information such as social media and other real-time feeds that will be used to display the augmented videos and creates and saves a user account in the data base 211.

In block 715, the processor 230 executes engine 300 to allow the user to create specific calls to action to be associated with one or more of the videos.

In block 720, the user selects videos to receive the calls to action and adds the videos to a campaign or channel.

In block 725, the user adds the calls to action to the videos. In block 730, the user configures the calls to action for the selected videos and applies filters on what type of posts will appear on the videos. In block 735, the user determines when and where calls to action will be displayed to viewers watching the videos.

Once all the videos in the campaign or channel are configured with the desired calls to action, in block 740, the user deploys the videos to the designated feeds. All videos in a designated campaign or channel may be deployed to multiple feeds with a simple one-click operation using the video bill board module and its associated user interface.

In block 745, when an augmented video embed code is loaded anywhere on the Internet, based on unique ID of embed code, the engine 300 determines which video to show and which calls to action to deploy.

In block 750, the engine 300 determines if a call to action is a live feed call to action. If the call to action is a live feed call to action, the engine 300 determines the source of the feed and the corresponding text to deploy. If the feed is a social network feed, the engine 300 uses the API of the social network to fetch and display the user's latest posts. If the feed is a RSS feed from a blog, the engine uses the RSS feed to determine what text to post.

Following deployment of the video, the calls to action, and any live feed texts, the engine records and saves viewer interactions, as described with respect to FIGS. 6A-6B. The process 700 then ends.

FIG. 8 illustrates an example process for replacing distributed, augmented videos with revised, augmented videos. The revised, augmented videos may be changed at or through a video hosting site. This action is completed without the need to change the embed code for an original, distributed video.

In FIG. 8, replace video process 800 begins in block 805, when the user imports one or more updated videos from, for example, a video hosting site and the processor 230 automatically adds the updated video(s) to the user's account, with the updated videos configured with the embed code of the prior video(s) so as to play the updated video(s) with the set of interactive calls to action. In an embodiment, anytime the user revises a video at the video hosting site, the processor automatically imports the revised video.

In block 810, the user adds the updated video to the desired campaign(s) and checks the call to action placement on the updated video.

In block 820, the user, optionally, changes embed code configuration in engine 300 (dashboard—see FIG. 4A) to use the updated video. The updated video is intended to replace the original video, and will start playing in all feeds with the embed code and all calls to action intact.

In block 830, the user clicks a Replace Video Button in the dashboard and all currently distributed videos are replaced in real-time preserving interactivity using same deployed video embed code. Each embed code provided by the system 100 has a unique ID, and the system 100 maintains a mapping of videos corresponding to that unique ID. All the call to actions also map to the same unique ID. When a user replaces the video corresponding to a unique ID, only the video changes and displays the same, or edited, calls to action as with the original video. Since the calls to action are attached to a unique ID and not the video file, changing the video file while keeping the unique ID intact keeps the calls to action intact. Following block 830, process 800 ends.

Certain of the devices shown in FIGS. 1 and 3 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flow charts and accompanying descriptions to illustrate the embodiments represented in FIGS. 5-8. The disclosed devices, components, and systems contemplate using or implementing any suitable technique for performing the steps illustrated. Thus, FIGS. 5-8 are for illustration purposes only and the described or similar steps may be performed at any appropriate time, including concurrently, individually, or in combination. In addition, many of the steps in the flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A computer-implemented method for operating a video management and marketing system that enables managing and marketing videos produced or provided by a user, comprising:
   a processor configures an embed code that is unique to the user to show a real-time call to action that streams real-time data in one or more videos displayed to a viewer at a viewer device;
   the processor determines when the embed code is loaded in a video based on reading a unique ID assigned in the system to the embed code;
   the processor determines that the real-time call to action is a live feed call to action and determines the text and images to deploy based on a source of the live feed call to action;
   the processor displays the real-time call to action during playback of the video at a first site and uses the real-time call to action to fetch call to action information on the fly; and
   the processor automatically forwards the viewer device to a second site, where the call to action information is displayed, upon completion of playback of the video at the first site.

2. The method of claim 1, wherein the processor displays the real-time call to action at locations in the video as designated by the user.

3. The method of claim 1, wherein the locations comprise one or both of spatial and temporal.

4. The method of claim 1, wherein the processor:
   receives a registration request from the user;
   provides the user with access to the video management and marketing system and creates a user account;
   receives from the user, information related to videos to be augmented with calls to action, the information including user-designated real-time feeds that will be used to display the videos to be augmented;
   allows the user to create specific calls to action to be associated with one or more of the videos; and
   receives a user selection of videos to receive the calls to action;
   adds the calls to action to the videos, and
   adds the videos to a campaign or channel.

5. The method of claim 4, wherein the processor:
   receives from the user, configurations for the calls to action for the selected videos; and
   deploys videos with configured calls to action to the user-designated real-time feeds.

6. The method of claim 4, wherein the processor updates calls to action, comprising the processor:
receiving one or more updated videos; and
automatically adding the updated videos to the user's account, with the updated videos configured with the embed code of the prior videos so as to play the updated videos with the set of interactive calls to action.

7. The method of claim 6, wherein the processor adds the updated videos to the desired campaign(s) and checks the call to action placement on the updated video.

8. The method of claim 6 wherein the user changes embed code configuration to use the updated video.

9. The method of claim 6 wherein all the user's videos are replaced simultaneously in real-time preserving interactivity based on the user's embed code.

10. A computer-implemented method for operating a video management and marketing system that enables managing and marketing videos produced or provided by a user, comprising:
a processor configures a user-unique embed code that links a real time call to action to a video;
during playback of the video to a viewer at a first site, the processor uses the link to display the real-time call to action and fetch call to action information on the fly;
the processor determines when the embed code is loaded in a video based on reading a unique ID assigned in the system to the embed code;
the processor determines that the real time call to action is a live feed call to action and determines the text and images to deploy based on a source of the live feed call to action; and
the processor automatically forwards the viewer device to a second site upon completion of playback of the video at the first site.

11. A non-transitory computer readable storage medium having encoded thereon instructions for operating a video management and marketing system that enables managing and marketing videos produced or provided by a user, the instructions, when executed, cause the processor to:
register the user and create a user account;
configure an embed code that is unique to the user to show a real-time call to action that streams real-time data in one or more videos displayed to a viewer at a viewer device;
determine when the embed code is loaded in a video based on reading a unique ID assigned in the system to the embed code;
determine that the real-time call to action is a live feed call to action and determine text and images to deploy based on a source of the real-time call to action;
display the real-time call to action during playback of the video at a first site and use the real-time call to action to fetch call to action information on the fly; and
automatically forward the viewer device to a second site upon completion of playback of the video at the first site.

12. The computer-readable storage medium of claim 11, wherein the processor:
receives one or more updated videos for a desired campaign of the user;
automatically adds the updated videos to the user's account, with the updated videos configured with the embed code of the prior videos so as to play the updated videos with the set of interactive calls to action; and
adds the updated videos to the desired campaign of the user.

* * * * *